(12) United States Patent
Vestemean et al.

(10) Patent No.: US 12,292,986 B2
(45) Date of Patent: May 6, 2025

(54) METHOD AND SYSTEM FOR DIGITAL DOCUMENT SECURITY

(71) Applicants: Radu Vestemean, Thornhill (CA); Marius Oancea, Kanata (CA)

(72) Inventors: Radu Vestemean, Thornhill (CA); Marius Oancea, Kanata (CA)

( * ) Notice: Subject to any disclaimer, the term of this patent is extended or adjusted under 35 U.S.C. 154(b) by 211 days.

(21) Appl. No.: 18/215,702

(22) Filed: Jun. 28, 2023

(65) Prior Publication Data

US 2023/0344653 A1    Oct. 26, 2023

(51) Int. Cl.
| | | |
|---|---|---|
| *G06F 21/62* | (2013.01) | |
| *G06F 21/64* | (2013.01) | |
| *G06K 19/06* | (2006.01) | |
| *G06Q 50/26* | (2012.01) | |
| *G06T 1/00* | (2006.01) | |
| *G06T 3/40* | (2006.01) | |
| *G06T 5/90* | (2024.01) | |
| *H04L 9/30* | (2006.01) | |
| *H04L 9/32* | (2006.01) | |

(52) U.S. Cl.
CPC .......... *G06F 21/6209* (2013.01); *G06F 21/64* (2013.01); *G06K 19/06037* (2013.01); *G06K 19/06075* (2013.01); *G06K 19/06103* (2013.01); *G06Q 50/265* (2013.01); *G06T 1/0021* (2013.01); *G06T 3/40* (2013.01); *G06T 5/90* (2024.01); *H04L 9/30* (2013.01); *H04L 9/3263* (2013.01); *H04L 9/3268* (2013.01)

(58) Field of Classification Search
CPC .................................................. G06F 21/6209
See application file for complete search history.

(56) References Cited

U.S. PATENT DOCUMENTS

| | | | |
|---|---|---|---|
| 8,463,765 | B2 | 6/2013 | Lesavich |
| 9,037,564 | B2 | 5/2015 | Lesavich et al. |
| 9,137,250 | B2 | 9/2015 | Lesavich et al. |
| 9,361,479 | B2 | 6/2016 | Lesavich et al. |
| 9,569,771 | B2 | 2/2017 | Lesavich et al. |
| 9,635,000 | B1 | 4/2017 | Muftic |
| 9,830,593 | B2 | 11/2017 | Myers |
| 10,091,003 | B2 | 10/2018 | Bhandarkar |
| 10,122,661 | B2 | 11/2018 | Golan |
| 10,135,767 | B2 | 11/2018 | Murphy |
| 10,164,779 | B2 | 12/2018 | Uhr |

(Continued)

FOREIGN PATENT DOCUMENTS

| | | |
|---|---|---|
| CN | 104598904 A | 5/2015 |
| CN | 109522768 A | 3/2019 |

(Continued)

*Primary Examiner* — Bradley W Holder
(74) *Attorney, Agent, or Firm* — Lesavich High-Tech Law Group, S.C .; Stephen Lesavich

(57) ABSTRACT

A method and system for digital document security with embedded Quick Response (QR) codes. A Quick Response (QR) code with a digital picture is embedded in a digital document creating a secure digital document. The secure digital document with the embedded QR code helps to prevent tampering of the secure digital document. Upon scanning the QR code in the secure digital document, the contents of the digital document and the contents of digital picture are verified confirming the authenticity, integrity, non-repudiation and non-tampering of the contents of the digital picture and the secure digital document.

21 Claims, 15 Drawing Sheets

(56) References Cited

U.S. PATENT DOCUMENTS

| | | |
|---|---|---|
| 10,229,275 B2 | 3/2019 | Unitt |
| 10,277,398 B2 | 4/2019 | Weimer |
| 10,305,833 B1 | 5/2019 | Dennis |
| 10,333,705 B2 | 6/2019 | Smith |
| 10,366,315 B1 | 7/2019 | Kumar |
| 10,419,218 B2 | 9/2019 | Bonnell |
| 10,439,812 B2 | 10/2019 | Patin |
| 10,447,483 B1 | 10/2019 | Su |
| 10,454,683 B2 | 10/2019 | Weimer |
| 10,482,533 B2 | 11/2019 | Leonard |
| 10,497,037 B2 | 12/2019 | Isaacson |
| 10,505,736 B1 | 12/2019 | Meixler |
| 10,505,737 B1 | 12/2019 | Xu |
| 10,505,877 B2 | 12/2019 | Golan |
| 10,521,776 B2 | 12/2019 | Zhou |
| 10,535,062 B1 | 1/2020 | Rule |
| 10,581,869 B2 | 3/2020 | Simons |
| 10,587,397 B2 | 3/2020 | Schnabel |
| 10,601,597 B2 | 3/2020 | Callan |
| 10,762,060 B1 | 9/2020 | Faulkner |
| 11,151,123 B2 | 10/2021 | Irazabel |
| 11,322,255 B2 | 5/2022 | Neumann |
| 2010/0321739 A1* | 12/2010 | Amagai .................... G06T 3/00 358/3.28 |
| 2011/0208710 A1 | 8/2011 | Lesavich |
| 2012/0120447 A1* | 5/2012 | Yoshida ............. H04N 1/00244 358/1.15 |
| 2012/0278622 A1 | 11/2012 | Lesavich et al. |
| 2014/0189792 A1 | 7/2014 | Lesavich et al. |
| 2015/0222783 A1* | 8/2015 | Choi .................. H04N 1/00342 235/375 |
| 2015/0379301 A1 | 12/2015 | Lesavich et al. |
| 2016/0321654 A1 | 11/2016 | Lesavich et al. |
| 2018/0302417 A1 | 10/2018 | Wilson |
| 2019/0260761 A1 | 8/2019 | Wilson |
| 2019/0034926 A1 | 11/2019 | Smith |
| 2019/0372769 A1 | 12/2019 | Fisher |
| 2020/0036707 A1 | 1/2020 | Callahan |
| 2022/0094556 A1 | 3/2022 | Vestemean |
| 2022/0094739 A1 | 3/2022 | Vestemean |
| 2022/0309303 A1* | 9/2022 | Bulat-Ag ......... G06K 19/06037 |

FOREIGN PATENT DOCUMENTS

| | | |
|---|---|---|
| EP | 3183681 B1 | 6/2017 |
| GB | 2552310 A | 8/2016 |

\* cited by examiner

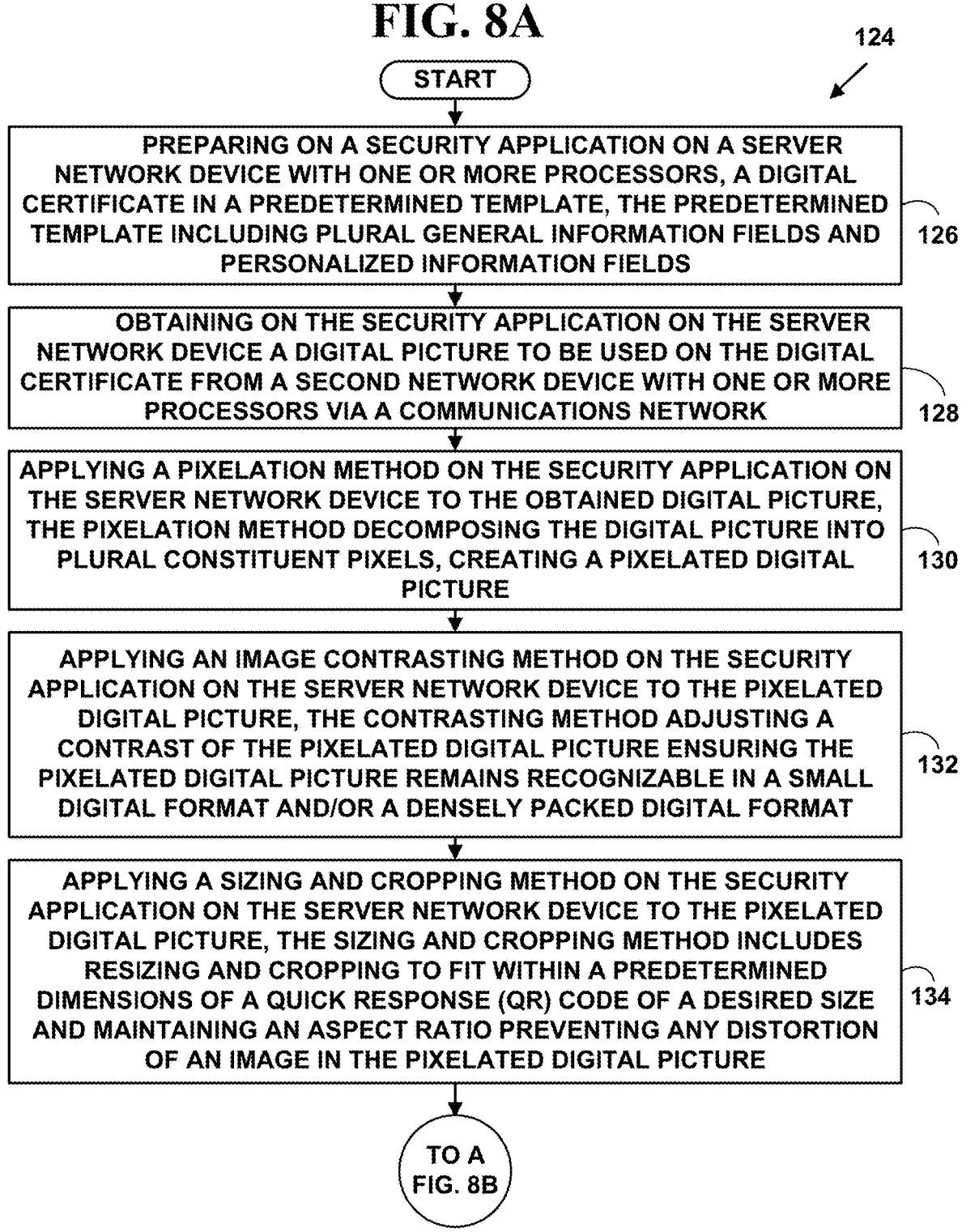

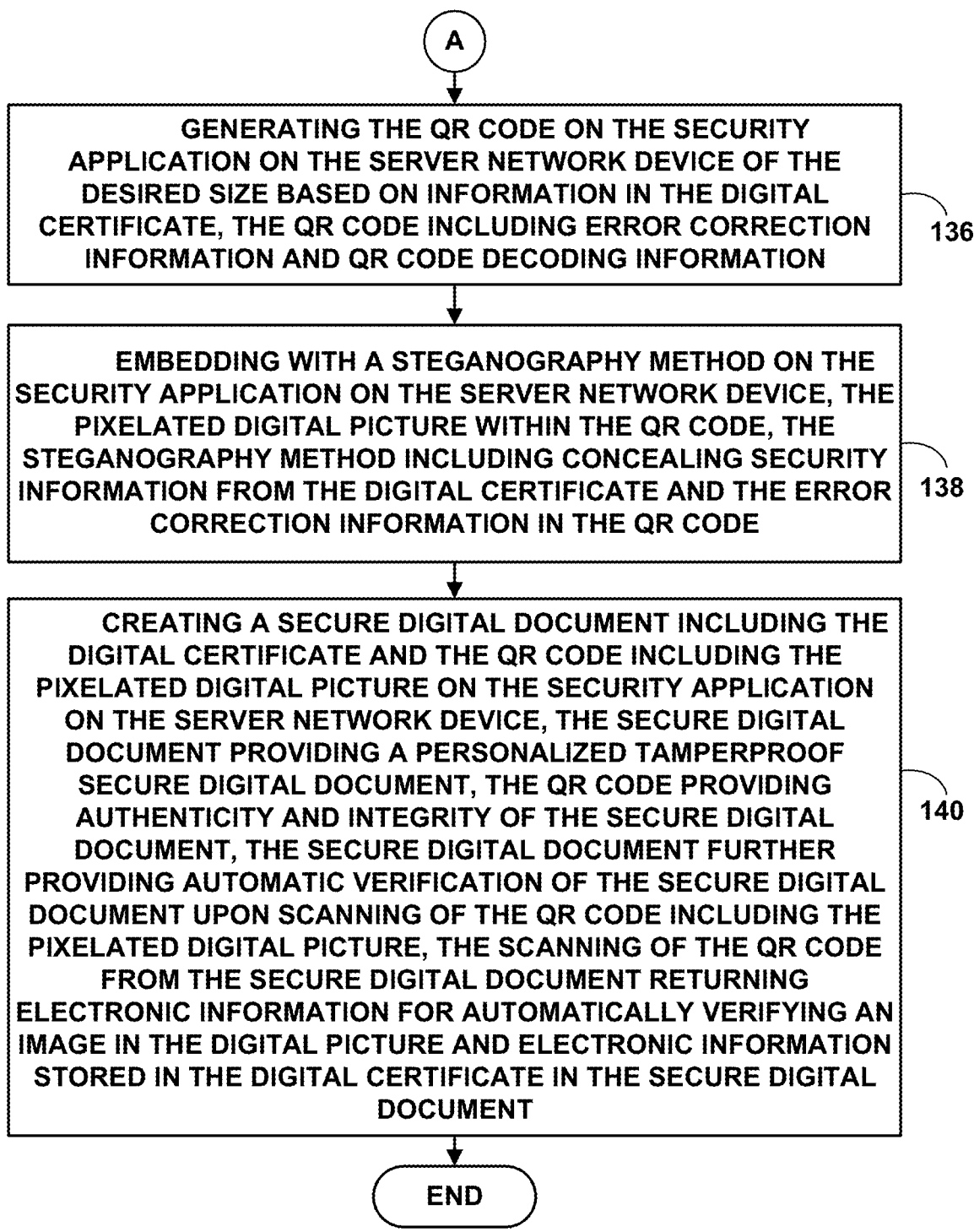

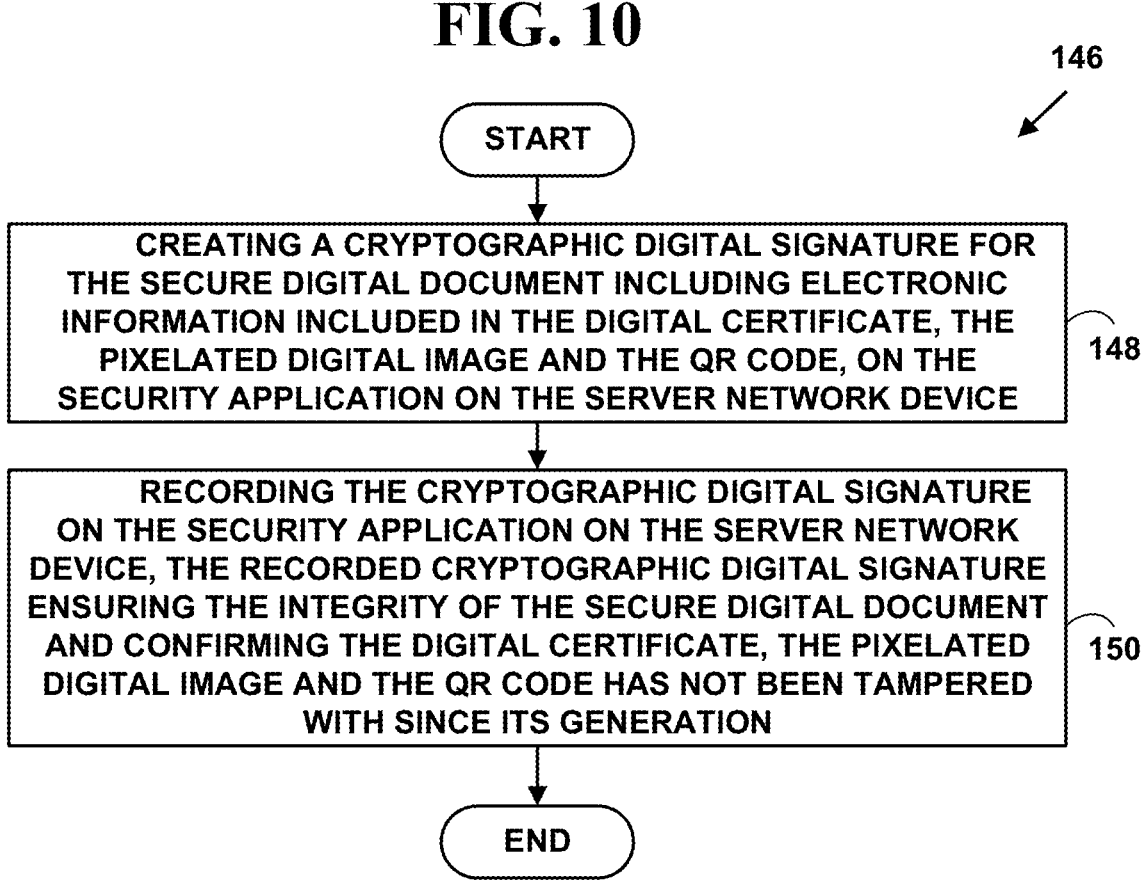

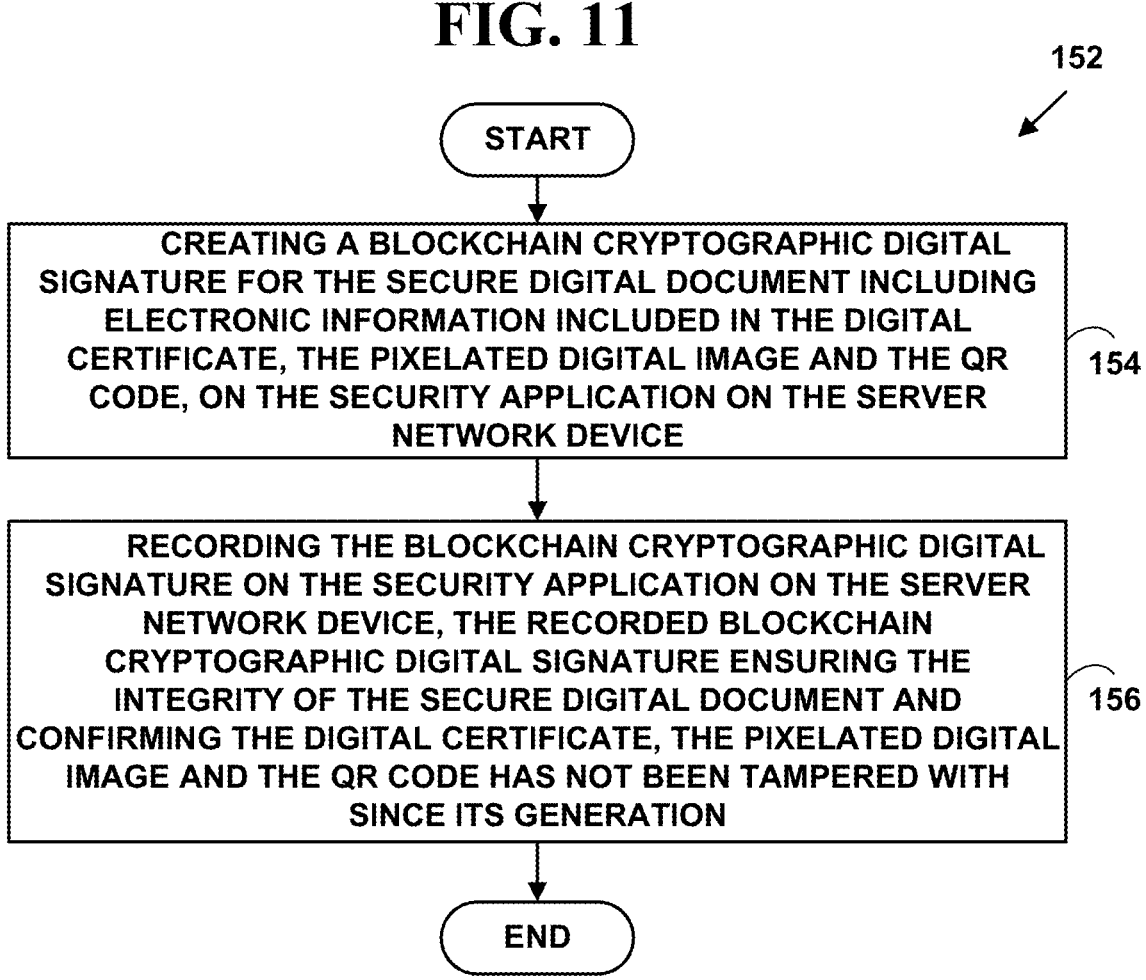

FIG. 12

```
                    ┌─────────┐
                    │  START  │                          158
                    └────┬────┘                         ↙
                         ▼
    ┌────────────────────────────────────────────────┐
    │ SCANNING THE QR CODE ON THE SECURE DIGITAL     │
    │ DOCUMENT ON SECOND NETWORK DEVICE RETURNING    │
    │ ELECTRONIC INFORMATION AND AUTOMATICALLY       │── 160
    │ VERIFYING AN IMAGE IN THE DIGITAL PICTURE AND  │
    │ ELECTRONIC INFORMATION STORED IN THE DIGITAL   │
    │ CERTIFICATE IN THE SECURE DIGITAL DOCUMENT     │
    └────────────────────┬───────────────────────────┘
                         ▼
    ┌────────────────────────────────────────────────┐
    │ SCANNING THE QR CODE ON THE SECURE DIGITAL     │
    │ DOCUMENT ON SECOND NETWORK DEVICE RETURNING    │
    │ ELECTRONIC INFORMATION AND AUTOMATICALLY       │── 162
    │ VERIFYING AN IMAGE IN THE DIGITAL PICTURE AND  │
    │ ELECTRONIC INFORMATION STORED IN THE DIGITAL   │
    │ CERTIFICATE IN THE SECURE DIGITAL DOCUMENT     │
    └────────────────────┬───────────────────────────┘
                         ▼
                    ┌─────────┐
                    │   END   │
                    └─────────┘
```

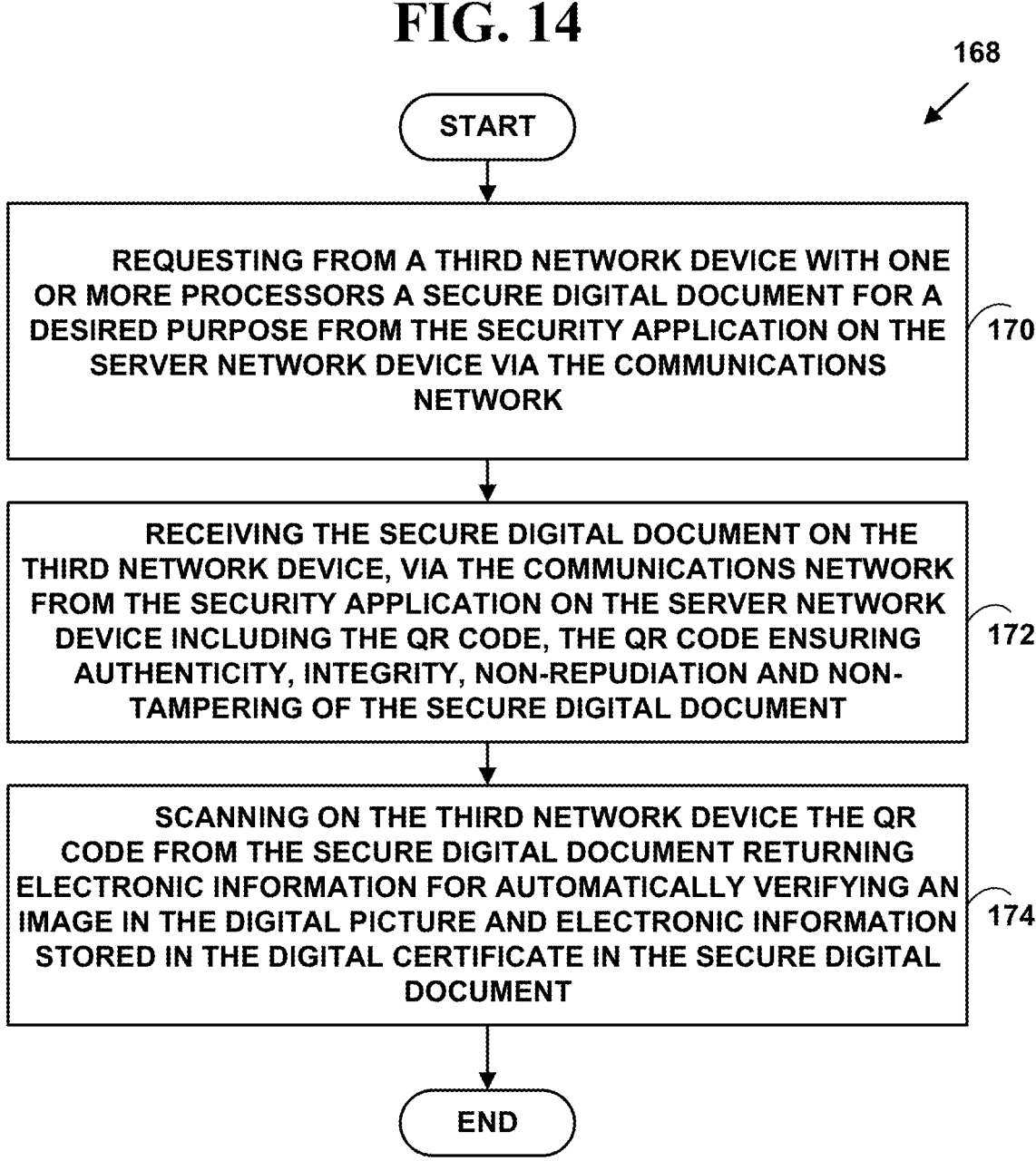

METHOD AND SYSTEM FOR DIGITAL DOCUMENT SECURITY

CROSS REFERENCES TO RELATED APPLICATIONS

Not Applicable.

FIELD OF INVENTION

This invention relates to creating secure digital documents. More specifically, it relates to a method and system for digital document security using embedded QR codes.

BACKGROUND OF THE INVENTION

The issuance and verification of tamper-proof digital certificates and digital documents, for background checks, law enforcement checks and various achievement-related certificates is important.

There are several problems associated with creating tamper-proof digital documents. One problem is that it is difficult to create tamper-proof digital documents. Another problem is that it is difficult to verify a digital document is authentic. Another problem is that it is difficult to create a personalized secure digital document. Another problem is that it is difficult to verify a secure digital document has been created by a trusted source. Another problem is that various bar codes have been added to digital documents to make them tamper proof. It is difficult to verify a bar code has not been tampered with on the digital documents.

There have been various attempts to add bar codes to create secure digital documents including visual codes and blockchains.

For example, U.S. Pat. No. 11,151,123, that issued to Irazabel teaches "An example operation may include one or more of obtaining a machine-readable code from a first document among a set of documents, extracting a probabilistic data structure from the machine-readable code which includes probabilistic hashes accumulated from the set of documents, determining whether a document hash of a second document is included within the probabilistic data structure, and in response to a determination that the document hash is included within the probabilistic data structure, outputting a notification indicating the second document is included in the set of documents."

U.S. Pat. No. 10,366,315, that issued to Kumar, teaches "Methods and apparatuses are described for generating a quick response (QR) grid that represents electronic data associated with a digital document. A server captures electronic data associated with a digital document, the electronic data comprising a plurality of key-value pairs. The server determines a total size of the electronic data and partitions the electronic data into two or more portions. The server generates a map of QR codes based upon the two or more portions of electronic data, each QR code in the map comprising a header, a footer, and a payload containing one of the two or more portions of electronic data. The server creates a QR grid using the map of QR codes. The server prints a physical document that corresponds to the digital document, the physical document including the created QR grid."

U.S. Pat. No. 10,091,003 that issued to Bhandarkar teaches "Systems and methods provide for efficiently obtaining biometric signatures for electronically signing digital documents. A digital document having a signature field is provided for display on a general computing device. An instruction to obtain a biometric signature from a mobile computing device is received on the general computing device. A remote signing request is sent to a remote server device. The request can include, among other things, an electronic contact address associated with the mobile computing device. Responsive to receiving the request, a Uniform Resource Identifier (URI) is generated, referencing a dynamic application for obtaining the biometric signature on the mobile computing device. The remote server device obtains the biometric signature via the dynamic application or an incoming electronic message from the mobile computing device via the electronic contact address. The biometric signature is communicated to the client device for association with the signature field of the digital document."

U.S. Published Patent Application US2020/036707A1 published by Callahan "Secure communications are provided between a user computing device and a server computing device. An enrollment request is received from a user computing device that is configured via a distributed client software application and is processed. The enrollment request is usable to enroll the user computing device in a network and includes an encrypted partial initial biometric vector associated with a user. An authentication request is processed that is subsequently received that includes an encrypted partial second biometric vector and that is associated with a user of the user computing device. A comparison of the encrypted partial initial biometric vector and the encrypted partial second biometric vector is performed, and a value representing the comparison is generated and transmitted to the user computing device. The user computing device is authenticated where the value is above a minimum threshold."

U.S. Published Patent Application US2019/0372769A1, published by Fischer teaches "A visual code may be used to embed a universal identifier directly into document content. The universal identifier may include a reference to a respective location within a distributed ledger and can be used to retrieve information related to the document including version information, author information, audit information, and signature information."

However, none of these attempts solve all of the problems creating secure digital documents. Thus, it is desirable to solve some of the problems associated with creating secure digital documents.

SUMMARY OF THE INVENTION

In accordance with preferred embodiments of the present invention, some of the problems associated with secure digital documents are overcome. A method and system for digital document security with embedded Quick Response (QR) codes is presented.

A Quick Response (QR) code with a digital picture is embedded in a digital document creating a secure digital document. The secure digital document with the embedded QR code helps to prevent tampering of the secure digital document. Upon scanning the QR code in the secure digital document, the contents of the digital document and the contents of digital picture are verified confirming the authenticity, integrity and non-repudiation and non-tampering of the contents of the digital picture and the secure digital document.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIGS. 8A-8B are a flow diagram illustrating a method for digital document security processing;

FIG. 10 is a flow diagram illustrating a method for digital document security processing;

FIG. 11 is a flow diagram illustrating a method for digital document security processing;

FIG. 12 is a flow diagram illustrating a method for digital document security processing;

FIG. 14 is a flow diagram illustrating a method for digital document security processing.

DETAILED DESCRIPTION OF THE INVENTION

Automatic Electronic Digital Document Security Processing and Display System

Figure 1:
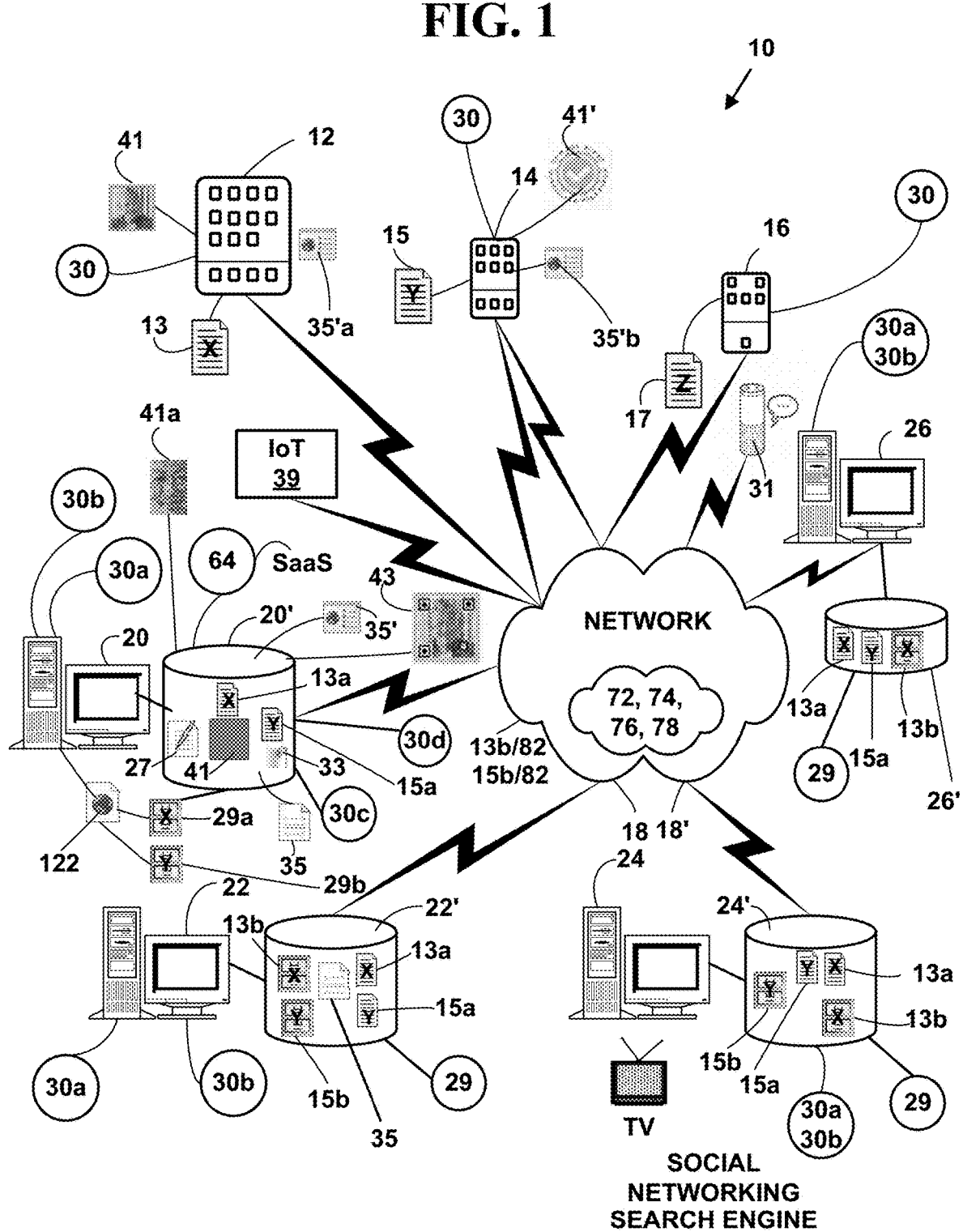
FIG. 1 is a block diagram illustrating an automatic electronic digital document security processing and display system.

FIG. 1 is a block diagram illustrating an automatic electronic digital document security processing and display system 10. The exemplary electronic system 10 includes, but is not limited to, one or more target network devices 12, 14, 16, 31, 39, 98-104 etc. each with one or more processors and each with a non-transitory computer readable medium.

The one or more target network devices 12, 14, 16 (illustrated in FIG. 1 only as a tablet and two smart phones for simplicity) include, but are not limited to, desktop and laptop computers, tablet computers, mobile phones, non-mobile phones with displays, smart phones, Internet phones, Internet appliances, personal digital/data assistants (PDA), portable, handheld and desktop video game devices, cable television (CATV), satellite television (SATV) and Internet television set-top boxes, digital televisions including high definition television (HDTV), three-dimensional (3DTV) televisions, wearable network devices 98-106 (FIG. 6), smart speakers 31, Internet of Things (IoT) devices 39, and/or other types of network devices.

A "smart phone" is a mobile phone 14 that offers more advanced computing ability and connectivity than a contemporary basic feature phone. Smart phones and feature phones may be thought of as handheld computers integrated with a mobile telephone, but while most feature phones are able to run applications based on platforms such as JAVA ME, a smart phone usually allows the user to install and run more advanced applications. Smart phones and/or tablet computers run complete operating system software providing a platform for application developers.

The tablet computers 12 include, but are not limited to, tablet computers such as the IPAD, by APPLE, Inc., the HP Tablet, by HEWLETT PACKARD, Inc., the PLAYBOOK, by RIM, Inc., the TABLET, by SONY, Inc., etc.

A "smart speaker" 31 is a type of wireless speaker and voice command device with an integrated virtual assistant that offers interactive actions and hands-free activation with the help of one "hot word" (or several "hot words"). Some smart speakers can also act as a smart device that utilizes Wi-Fi, Bluetooth and other wireless protocol standards to extend usage beyond audio playback, such as to control home automation devices. This can include, but is not be limited to, features such as compatibility across a number of services and platforms, peer-to-peer connection through mesh networking, virtual assistants, and others. Each can have its own designated interface and features in-house, usually launched or controlled via application or home automation software. Some smart speakers also include a screen to show the user a visual response.

The IoT network devices 39, include but are not limited to, security cameras, doorbells with real-time video cameras, baby monitors, televisions, set-top boxes, lighting, heating (e.g., smart thermostats, etc.), ventilation, air conditioning (HVAC) systems, and appliances such as washers, dryers, robotic vacuums, air purifiers, ovens, refrigerators, freezers, toys, game platform controllers, game platform attachments (e.g., guns, googles, sports equipment, etc.), and/or other IoT network devices.

The target network devices 12, 14, 16, 31, 39, 98-104 are in communications with a cloud communications network 18 or a non-cloud computing network 18' via one or more wired and/or wireless communications interfaces. The cloud communications network 18, is also called a "cloud computing network" herein and the terms may be used interchangeably.

The plural target network devices 12, 14, 16, 31, 39, 98-104 make requests 13, 15 for electronic messages via the cloud communications network 18 or non-cloud communications network 18'

The cloud communications network 18 and non-cloud communications network 18' includes, but is not limited to, communications over a wire connected to the target network devices, wireless communications, and other types of communications using one or more communications and/or networking protocols.

Plural server network devices 20, 22, 24, 26 (only four of which are illustrated) each with one or more processors and a non-transitory computer readable medium include one or more associated databases 20', 22', 24', 26'. The plural network devices 20, 22, 24, 26 are in communications with the one or more target devices 12, 14, 16, 31, 39, 98-104 via the cloud communications network 18 and non-cloud communications network 18'.

Plural server network devices 20, 22, 24, 26 (only four of which are illustrated) are physically located on one more public networks 76 (See FIG. 4), private networks 72, community networks 74 and/or hybrid networks 78 comprising the cloud network 18.

One or more server network devices (e.g., 20, 22, 24, 26, etc.) store portions 13', 15' of the electronic content 13, 15 as cloud storage objects 82 (FIG. 5) as is described herein.

The plural server network devices 20, 22, 24 26, may be connected to, but are not limited to, World Wide Web servers, Internet servers, search engine servers, vertical search engine servers, social networking site servers, file servers, other types of electronic information servers, and other types of server network devices (e.g., edge servers, firewalls, routers, gateways, etc.).

The plural server network devices 20, 22, 24, 26 also include, but are not limited to, network servers used for cloud computing providers, etc.

The cloud communications network 18 and non-cloud communications network 18' includes, but is not limited to, a wired and/or wireless communications network comprising one or more portions of: the Internet, an intranet, a Local Area Network (LAN), a wireless LAN (WiLAN), a Wide Area Network (WAN), a Metropolitan Area Network (MAN), a Public Switched Telephone Network (PSTN), a Wireless Personal Area Network (WPAN) and other types of wired and/or wireless communications networks 18.

The cloud communications network 18 and non-cloud communications network 18' includes one or more gateways, routers, bridges and/or switches. A gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments based on some pre-determined sequence (e g, timing, sequence number, etc.).

An operating environment for the network devices of the exemplary electronic information display system 10 include a processing system with one or more high speed Central Processing Unit(s) (CPU), processors, one or more memories and/or other types of non-transitory computer readable mediums. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical information by the CPU or processor. An electrical system represents data bits which cause a resulting transformation or reduction of the electrical information or biological information, and the maintenance of data bits at memory locations in a memory system to thereby reconfigure or otherwise alter the CPU's or processor's operation, as well as other processing of information. The memory locations where data bits are maintained are physical locations that have particular electrical, magnetic, optical, or organic properties corresponding to the data bits.

The data bits may also be maintained on a non-transitory computer readable medium including magnetic disks, optical disks, organic memory, and any other volatile (e.g., Random Access Memory (RAM)) or non-volatile (e.g., Read-Only Memory (ROM), flash memory, etc.) mass storage system readable by the CPU. The non-transitory computer readable medium includes cooperating or interconnected computer readable medium, which exist exclusively on the processing system or can be distributed among multiple interconnected processing systems that may be local or remote to the processing system.

Exemplary Electronic Content Display System

Figure 2:
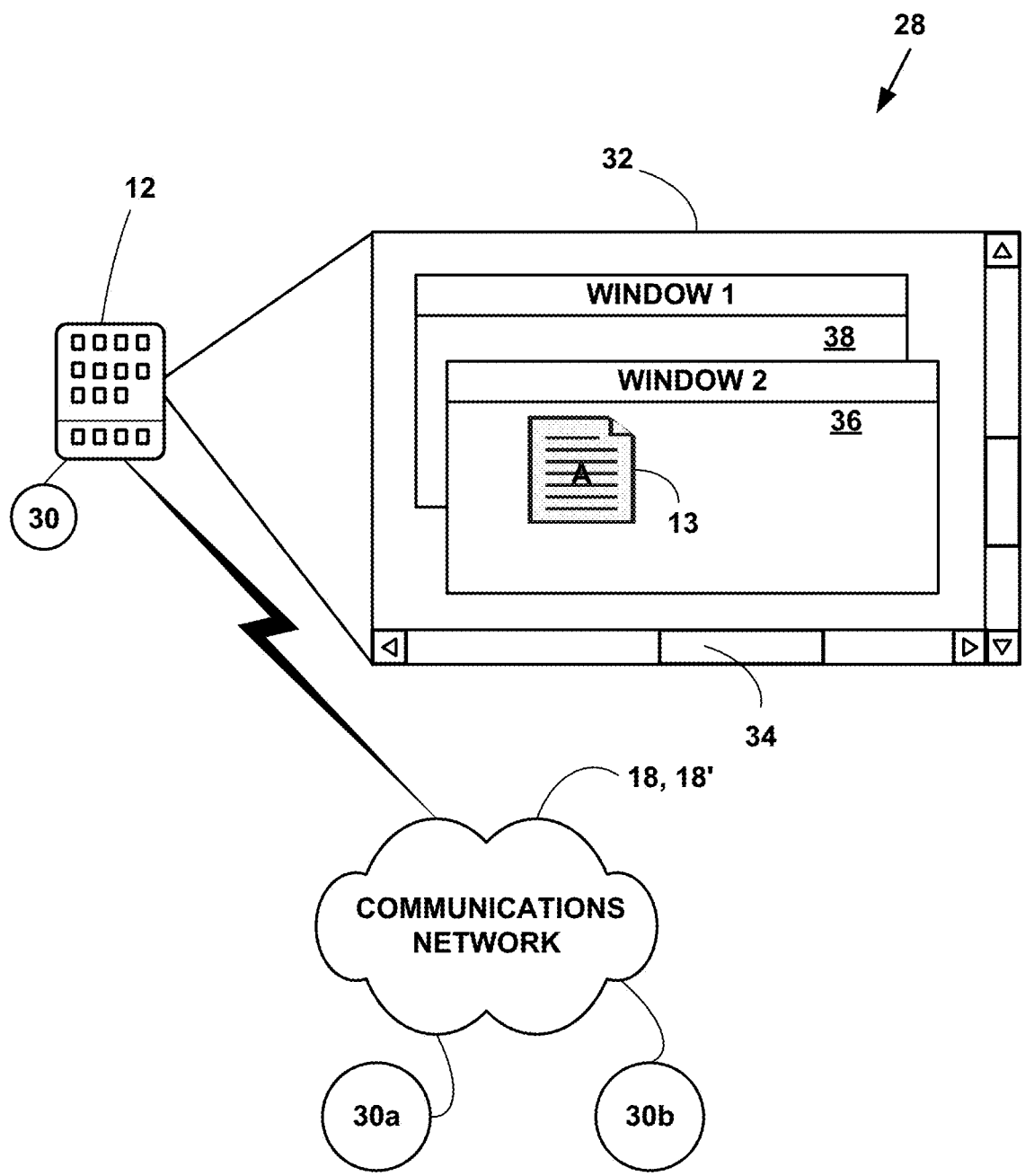
FIG. 2 is a block diagram illustrating an automatic electronic digital document security processing display system.

FIG. 2 is a block diagram illustrating an automatic electronic digital document security processing display system 28.

The automatic electronic digital document security processing and display system 12' includes, but is not limited to a target network device (e.g., 12, etc.) with an application 30 and a display component 32. The application 30 presents a graphical user interface (GUI) 34 on the display 32 component. The GUI 32 presents a multi-window 36, 38, etc. (only two of which are illustrated) interface to a user.

In one embodiment of the invention, the application 30 is a software application. However, the present invention is not limited to this embodiment and the application 30 can be hardware, firmware, hardware and/or any combination thereof. In one embodiment, the application 30 includes a mobile application for a smart phone, electronic tablet and/or other network device. In one embodiment, the application 30 includes web-browser based application. In one embodiment, the application 30 includes a web-chat client application. In another embodiment, the application 30*a*, 30*b*, 30*c*, 30*d* includes a cloud application used on a cloud communications network 18. However, the present invention is not limited these embodiments and other embodiments can be used to practice the invention In another embodiment, a portion of the application 30 is executing on the target network devices 12, 14, 16, 31, 39, 98-104 and another portion of the application 30*a*, 30*b*, 30*c*, 30*d* is executing on the server network devices 20, 22, 24, 26. The applications also include one or more library applications. However, the present invention is not limited these embodiments and other embodiments can be used to practice the invention.

Exemplary Networking Protocol Stack

Figure 3:
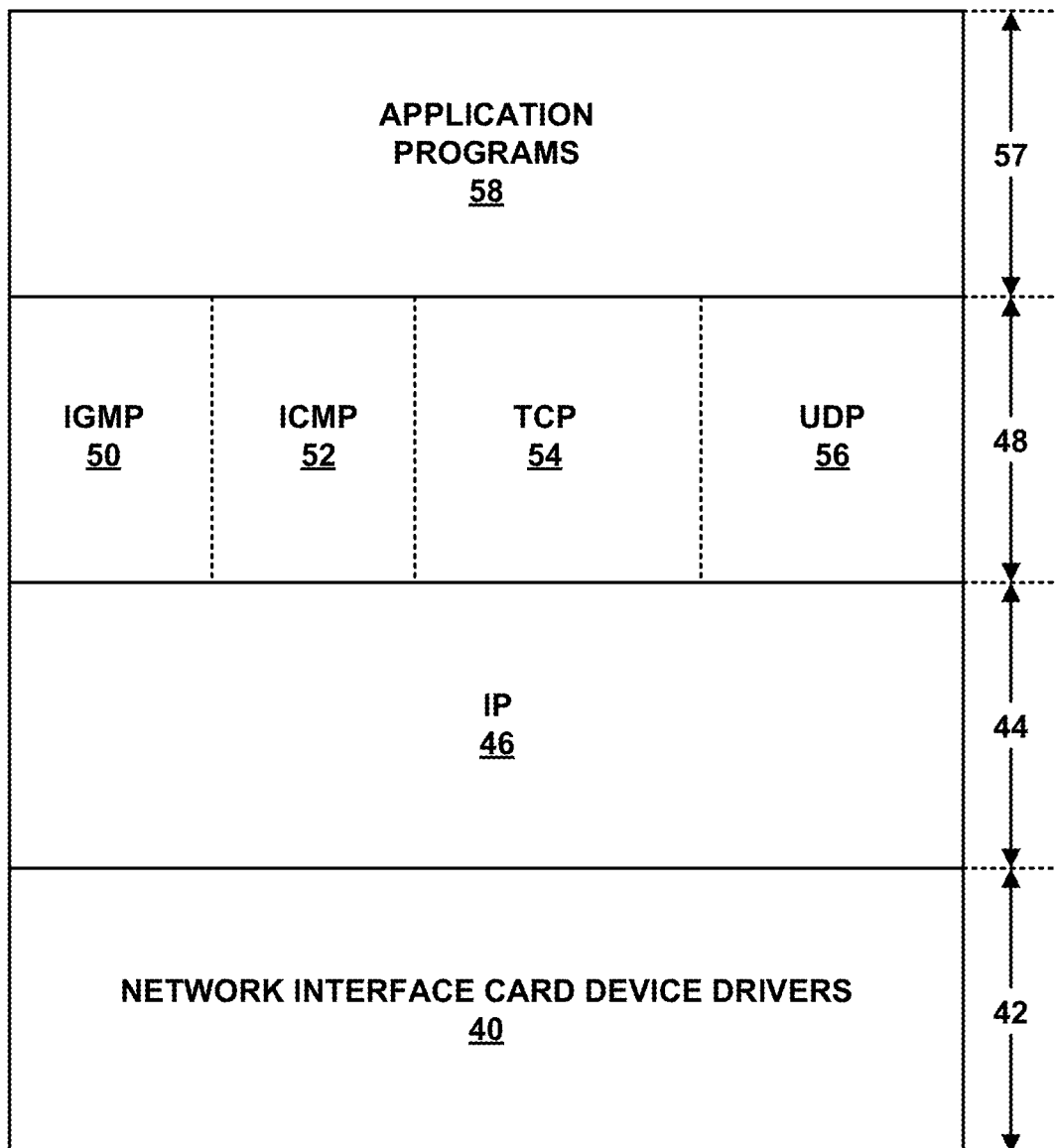
FIG. 3 is a block diagram illustrating an exemplary networking protocol stack.

FIG. 3 a block diagram illustrating a layered protocol stack 38 for network devices in the electronic message information display system 10.

The layered protocol stack 38 is described with respect to Internet Protocol (IP) suites comprising in general from lowest-to-highest, a link 42, network 44, transport 48 and application 56 layers. However, more or fewer layers could also be used, and different layer designations could also be used for the layers in the protocol stack 38 (e.g., layering based on the Open Systems Interconnection (OSI) model including from lowest-to-highest, a physical, data-link, network, transport, session, presentation and application layer.).

The network devices 12, 14, 16, 20, 22, 24, 26, 31, 39, 98-104 are connected to the communication network 18 with Network Interface Card (MC) cards including device drivers 40 in a link layer 42 for the actual hardware connecting the network devices 12, 14, 16, 20, 22, 24, 26, 31, 39, 98-104 to the cloud communications network 18. For example, the NIC device drivers 40 may include a serial port device driver, a digital subscriber line (DSL) device driver, an Ethernet device driver, a wireless device driver, a wired device driver, etc. The device drivers interface with the actual hardware being used to connect the network devices to the cloud communications network 18. The NIC cards have a medium access control (MAC) address that is unique to each NIC and unique across the whole cloud network 18. The Medium Access Control (MAC) protocol is used to provide a data link layer of an Ethernet LAN system and for other network systems.

Above the link layer 42 is a network layer 44 (also called the Internet Layer for Internet Protocol (IP) suites). The network layer 44 includes, but is not limited to, an IP layer 46.

IP 46 is an addressing protocol designed to route traffic within a network or between networks. However, more fewer or other protocols can also be used in the network layer 44, and the present invention is not limited to IP 46. For more information on IP 46 see IETF RFC-791, incorporated herein by reference.

Above network layer 44 is a transport layer 48. The transport layer 48 includes, but is not limited to, an optional Internet Group Management Protocol (IGMP) layer 50, an Internet Control Message Protocol (ICMP) layer 52, a Transmission Control Protocol (TCP) layer 52 and a User Datagram Protocol (UDP) layer 54. However, more, fewer or other protocols could also be used in the transport layer 48.

Optional IGMP layer 50, hereinafter IGMP 50, is responsible for multicasting. For more information on IGMP 50 see RFC-1112, incorporated herein by reference. ICMP layer 52, hereinafter ICMP 52 is used for IP 46 control. The main functions of ICMP 52 include error reporting, reachability testing (e.g., pinging, etc.), route-change notification, performance, subnet addressing and other maintenance. For more information on ICMP 52 see RFC-792, incorporated herein by reference. Both IGMP 50 and ICMP 52 are not required in the protocol stack 38. ICMP 52 can be used alone without optional IGMP layer 50.

TCP layer 54, hereinafter TCP 54, provides a connection-oriented, end-to-end reliable protocol designed to fit into a layered hierarchy of protocols which support multi-network applications. TCP 54 provides for reliable inter-process communication between pairs of processes in network devices attached to distinct but interconnected networks. For more information on TCP 54 see RFC-793, incorporated herein by reference.

UDP layer 56, hereinafter UDP 56, provides a connectionless mode of communications with datagrams in an interconnected set of computer networks. UDP 56 provides a transaction oriented datagram protocol, where delivery and duplicate packet protection are not guaranteed. For more information on UDP 56 see RFC-768, incorporated herein by reference. Both TCP 54 and UDP 56 are not required in protocol stack 38. Either TCP 54 or UDP 56 can be used without the other.

Above transport layer 48 is an application layer 57 where application programs 58 (e.g., 30, 30*a*, 30*b*, 30*c*, 30*d*, etc.) to carry out desired functionality for a network device reside. For example, the application programs 58 for the client network devices 12, 14, 16, 31, 39, 98-104 may include web-browsers or other application programs, application program 30, while application programs for the server network devices 20, 22, 24, 26 may include other application programs (e.g., 30*a*, 30*b*, 30*c*, 30*d*, etc.).

In one embodiment, application program 30 includes security application 30*a*, blockchain application 30*b*, an Artificial Intelligence (AI) application 30*c* and/or other application 30*d*. However, the present invention is not limited to such an embodiment and more, fewer and/or other applications can be used to practice the invention.

However, the protocol stack 38 is not limited to the protocol layers illustrated and more, fewer or other layers and protocols can also be used in protocol stack 38. In addition, other protocols from the Internet Protocol suites (e.g., Hyper Text Transfer Protocol (HTTP), File Transfer Protocol (FTP), Dynamic Host Configuration Protocol (DHCP), DNS, e-mail protocols, streaming protocols, and/or Peer-2-Peer (P2P) protocols, etc.) and/or other protocols from other protocol suites may also be used in protocol stack 38.

In addition, markup languages such as HyperText Markup Language (HTML), EXtensible Markup Language (XML) and others are used.

HyperText Markup Language (HTML) is a markup language for creating web pages and other information that can be displayed in a web browser.

HTML is written in the form of HTML elements consisting of tags enclosed in angle brackets within the web page content. HTML tags most commonly come in pairs although some tags represent empty elements and so are unpaired. The first tag in a pair is the start tag, and the second tag is the end tag (they are also called opening tags and closing tags). In between these tags web designers can add text, further tags, comments and other types of text-based content.

The purpose of a web browser is to read HTML documents and compose them into visible or audible web pages. The browser does not display the HTML tags, but uses the tags to interpret the content of the page.

HTML elements form the building blocks of all websites. HTML allows images and objects to be embedded and can be used to create interactive forms. It provides a means to create structured documents by denoting structural semantics for text such as headings, paragraphs, lists, links, quotes and other items. It can embed scripts written in languages such as JavaScript which affect the behavior of HTML web pages.

EXtensible Markup Language (XML) is another markup language that defines a set of rules for encoding documents in a format that is both human-readable and machine-readable. It is defined in the XML 1.0 Specification produced by the W3C, the contents of which are incorporated by reference and several other related specifications, all free open standards.

XML a textual data format with strong support via Unicode for the languages of the world. Although the design of XML focuses on documents, it is widely used for the representation of arbitrary data structures, for example in web services. The oldest schema language for XML is the Document Type Definition (DTD). DTDs within XML documents define entities, which are arbitrary fragments of text and/or markup tags that the XML processor inserts in the DTD itself and in the XML document wherever they are referenced, like character escapes.

The e-mail protocols includes, but are not limited to, Simple Mail Transfer Protocol (SMTP), Post Office Protocol (POP) and/or Internet Message Access Protocol (IMAP).

The Simple Mail Transfer Protocol (SMTP) is a communication protocol for electronic mail transmission. As an Internet standard, SMTP was first defined in 1982 by RFC 821, and updated in 2008 by RFC 5321 to Extended SMTP additions, which is the protocol variety in widespread use today. Mail servers and other message transfer agents use SMTP to send and receive mail messages. SMTP servers commonly use TCP on port number 25.

The Post Office Protocol (POP) is an application-layer Interne standard protocol used by e-mail clients to retrieve e-mail from a mail server. POP version 3 (POP3) is the version in common use. The Post Office Protocol provides access via an IP network for a user client application to a mailbox maintained on a mail server. The protocol supports download and delete operations for messages. POP3 clients connect, retrieve all messages, store them on the client computer, and finally delete them from the server.

The Internet Message Access Protocol (IMAP) is an Internet standard protocol used by email clients to retrieve email messages from a mail server over a TCP/IP connection. IMAP is defined by RFC 3501. IMAP was designed with the goal of permitting complete management of an email box by multiple email clients, therefore clients generally leave messages on the server until the user explicitly deletes them. An IMAP server typically listens on port number 143. IMAP over Secure Sockets Layer (SSL) (IMAPS) is assigned the port number 993.

The streaming and/or P2P protocols, including, but are not limited to, InterPlanetary File System (IPFS), BitTorrent, iTorrent, and other other streaming/P2P protocols.

The InterPlanetary File System (IPFS) is a protocol and peer-to-peer network for storing and sharing data in a distributed file system. IPFS uses content-addressing to uniquely identify each file in a global namespace connecting all computing devices. IPFS allows users to not only receive but host content, in a similar manner to BitTorrent. As opposed to a centrally located server, IPFS is built around a decentralized system of user-operators who hold a portion of the overall data, creating a resilient system of file storage and sharing. Any user in the network can serve a file by its content address, and other peers in the network can find and request that content from any node who has it using a distributed hash table (DHT).

BitTorrent is a communication protocol for peer-to-peer file sharing (P2P), that enables users to distribute data and electronic files over the Internet in a decentralized manner BitTorrent is one of the most common protocols for transferring large files; such as, digital video files containing TV shows and video clis, or digital audio files containing songs.

iTorrent, is a proprietary BitTorrent protocol client owned and developed by BitTorrent, Inc. With over 150 million users it is the most widely used BitTorrent client outside China; globally only behind Xunlei. The "μ" (Greek letter "m") in its name comes from the SI prefix "micro-", referring to the program's small memory footprint: the program was designed to use minimal computer resources while offering functionality comparable to larger BitTorrent clients such as Vuze or BitComet.

Preferred embodiments of the present invention include network devices and wired and wireless interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Bluetooth Forum, or the ADSL Forum.

Wireless Interfaces

In one embodiment of the present invention, the wireless interfaces on network devices 12, 14, 16, 20, 22, 24, 26, 31, 39, 98-104 include but are not limited to, cellular telephone, IEEE 802.11a, 802.11b, 802.11g, 802.11n, 802.15.4 (ZigBee), "Wireless Fidelity" (Wi-Fi), Wi-Fi Aware, "Worldwide Interoperability for Microwave Access" (WiMAX), ETSI High Performance Radio Metropolitan Area Network (HIPERMAN) and/or "RF Home" wireless interfaces.

In another embodiment of the present invention, the wireless sensor device may include an integral or separate Bluetooth and/or infra data association (IrDA) module for wireless Bluetooth or wireless infrared communications.

However, the present invention is not limited to such an embodiment and other 802.11xx and other types of wireless interfaces can also be used.

802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a. However, other 802.11XX interfaces can also be used and the present invention is not limited to the 802.11 protocols defined. The IEEE 802.11a, 802.11b and 802.11g standards are incorporated herein by reference.

Wi-Fi is a type of 802.11xx interface, whether 802.11b, 802.11a, dual-band, etc. Wi-Fi devices include an RF interfaces such as 2.4 GHz for 802.11b or 802.11g and 5 GHz for 802.11a.

In 802.11 wireless networking standards (including Wi-Fi), a service set is a group of wireless network devices that share a Service Set IDentifier (SSID) and is typically a natural language label (e.g., Radu's Home Network, etc.) that users see as a network name. For example, all of the network devices that together form and use a Wi-Fi network called Radu's Home Network are a service set. A service set forms a logical network of nodes operating with shared link-layer networking parameters; they form one logical network segment.

A service set is either a basic service set (BSS) or an extended service set (ESS). A basic service set is a subgroup, within a service set, of devices that share physical-layer medium access characteristics (e.g. radio frequency, modulation scheme, security settings, etc.) such that they are wirelessly networked. The basic service set is defined by a basic service set identifier (BSSID) shared by all devices within it. The BSSID includes a 48-bit label that conform to MAC-48 conventions. While a network device may have multiple BSSIDs, usually each BSSID is associated with at most one basic service set at a time.

802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, a full handshake protocol for transfer reliability, power management to ensure low power consumption for multi-month to multi-year battery usage and up to16 channels in the 2.4 GHz Industrial, Scientific and Medical (ISM) band (Worldwide), 10 channels in the 915 MHz (US) and one channel in the 868 MHz band (Europe). The IEEE 802.15.4-2003 standard is incorporated herein by reference.

WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. ETSI HIPERMAN can be used to provide a WLP.

Wi-Fi, is a family of wireless network protocols, based on the IEEE 802.11 family of standards, which are commonly used for local area networking of devices and Internet access, allowing nearby digital devices to exchange data by radio waves. These are the most widely used computer networks in the world, used globally in home and small office networks to link desktop and laptop computers, tablet computers, smartphones, smart TVs, printers, and smart speakers together and to a wireless router to connect them to the Internet, and in wireless access points in public places like coffee shops, hotels, libraries and airports to provide the public Internet access for mobile devices.

Wi-Fi Aware devices continuously discover other devices within a user's Wi-Fi range, making it easy to find nearby information and services that match preferences set by the user.

RF Home is a wireless networking specification for home devices. RF Home combines several wireless technologies in the 2.4 GHz ISM band, including IEEE 802.11 FH (i.e., the frequency-hopping version of wireless data networking) and DECT (i.e., the most prevalent digital cordless telephony standard in the world) to meet the unique home networking requirements for security, quality of service (QoS) and interference immunity.

In one embodiment, the plural server network devices 20, 22, 24, 26 include a connection to plural network interface cards (NICs) in a backplane connected to a communications bus. The NIC cards provide gigabit/second ($1 \times 10^9$ bits/second) communications speed of electronic information. This allows "scaling out" for fast electronic content retrieval. The NICs are connected to the plural server network devices 20, 22, 24, 26 and the cloud communications network 18. However, the present invention is not limited to the NICs described and other types of NICs in other configurations and connections with and/or without buses can also be used to practice the invention.

In one embodiment, of the invention, the wireless interfaces also include wireless personal area network (WPAN) interfaces. As is known in the art, a WPAN is a personal area network for interconnecting devices centered around an individual person's devices in which the connections are wireless. A WPAN interconnects all the ordinary computing and communicating devices that a person has on their desk (e.g. computer, etc.) or carry with them (e.g., PDA, mobile phone, smart phone, table computer two-way pager, etc.).

A key concept in WPAN technology is known as "plugging in." In the ideal scenario, when any two WPAN-equipped devices come into close proximity (within several meters and/or feet of each other) or within a few miles and/or kilometers of a central server (not illustrated), they can communicate via wireless communications as if connected by a cable. WPAN devices can also lock out other devices selectively, preventing needless interference or unauthorized access to secure information. Zigbee is one wireless protocol used on WPAN networks such as cloud communications network 18 or non-cloud communications network 18'.

The one or more target network devices 12, 14, 16, 20, 22, 24, 26, 31, 39, 98-104 and one or more server network devices 20, 22, 24, 26 communicate with each other and other network devices with near field communications (NFC) and/or machine-to-machine (M2M) communications.

"Near field communication (NFC)" is a set of standards for smartphones and similar network devices to establish radio communication with each other by touching them together or bringing them into close proximity, usually no more than a few centimeters. Present applications include contactless transactions, data exchange, and simplified setup of more complex communications such as Wi-Fi. Communication is also possible between an NFC device and an unpowered NFC chip, called a "tag" including radio frequency identifier (RFID) tags 99 and/or sensor.

NFC standards cover communications protocols and data exchange formats, and are based on existing radio-frequency identification (RFID) standards including ISO/IEC 14443 and FeliCa. These standards include ISO/IEC 1809 and those defined by the NFC Forum, all of which are incorporated by reference.

An "RFID tag" is an object that can be applied to or incorporated into a product, animal, or person for the purpose of identification and/or tracking using RF signals.

An "RFID sensor" is a device that measures a physical quantity and converts it into an RF signal which can be read by an observer or by an instrument (e.g., target network devices 12, 14, 16, 20, 22, 24, 26, 31, 39, 98-104 server network devices 20, 22, 24, 26, etc.).

"Machine to machine (M2M)" refers to technologies that allow both wireless and wired systems to communicate with other devices of the same ability. M2M uses a device to capture an event (such as option purchase, etc.), which is relayed through a network (wireless, wired cloud, etc.) to an application (software program), that translates the captured event into meaningful information. Such communication was originally accomplished by having a remote network of machines relay information back to a central hub for analysis, which would then be rerouted into a system like a personal computer.

However, modern M2M communication has expanded beyond a one-to-one connection and changed into a system of networks that transmits data many-to-one and many-to-many to plural different types of devices and appliances. The expansion of IP networks across the world has made it far easier for M2M communication to take place and has lessened the amount of power and time necessary for information to be communicated between machines.

However, the present invention is not limited to such wireless interfaces and wireless networks and more, fewer and/or other wireless interfaces can be used to practice the invention.

Wired Interfaces

In one embodiment of the present invention, the wired interfaces include wired interfaces and corresponding networking protocols for wired connections to the Public Switched Telephone Network (PSTN) and/or a cable television network (CATV) and/or satellite television networks (SATV) and/or three-dimensional television (3DTV), including HDTV that connect the network devices 12, 14, 16, 20, 22, 24, 26, 31, 39, 98-104 via one or more twisted pairs of copper wires, digital subscriber lines (e.g. DSL, ADSL, VDSL, etc.) coaxial cable, fiber optic cable, other connection media or other connection interfaces. The PSTN is any public switched telephone network provided by AT&T, GTE, Sprint, MCI, SBC, Verizon and others. The CATV is any cable television network provided by the Comcast, Time Warner, etc. However, the present invention is not limited to such wired interfaces and more, fewer and/or other wired interfaces can be used to practice the invention.

Television Services

In one embodiment, the applications 30, 30a, 30b, 30c, 30d provide cloud SaaS 64 services and/or non-cloud application services from television services over the cloud communications network 18 or application services over the non-cloud communications network 18'. The television services include digital television services, including, but not limited to, cable television, satellite television, high-definition television, three-dimensional, televisions and other types of network devices.

However, the present invention is not limited to such television services and more, fewer and/or other television services can be used to practice the invention.

Internet Television Services

In one embodiment, the applications 30, 30a, 30b, 30c, 30d provide cloud SaaS 64 services and/or non-cloud application services from Internet television services over the cloud communications network 18 or non-cloud communications network 18' The television services include Internet television, Web-TV, and/or Internet Protocol Television (IPtv) and/or other broadcast television services.

"Internet television" allows users to choose a program or the television show they want to watch from an archive of programs or from a channel directory. The two forms of viewing Internet television are streaming content directly to a media player or simply downloading a program to a viewer's set-top box, game console, computer, or other network device.

"Web-TV" delivers digital content via broadband and mobile networks. The digital content is streamed to a viewer's set-top box, game console, computer, or other network device.

"Internet Protocol television (IPtv)" is a system through which Internet television services are delivered using the architecture and networking methods of the Internet Protocol Suite over a packet-switched network infrastructure, e.g., the Internet and broadband Internet access networks, instead of being delivered through traditional radio frequency broadcast, satellite signal, and cable television formats.

However, the present invention is not limited to such Internet Television services and more, fewer and/or other Internet Television services can be used to practice the invention.

General Search Engine Services

In one embodiment, the applications 30, 30a, 30b, 30c, 30d provide cloud SaaS 64 services and/or non-cloud application services from general search engine services. A search engine is designed to search for information on a cloud communications network 18 or non-cloud communications network 18' such as the Internet including World Wide Web servers, HTTP, FTP servers etc. The search results are generally presented in a list of electronic results. The information may consist of web pages, images, electronic information, multimedia information, and other types of files. Some search engines also mine data available in databases or open directories. Unlike web directories, which are maintained by human editors, search engines typically operate algorithmically and/or are a mixture of algorithmic and human input.

In one embodiment, the applications 30, 30a, 30b, 30c, 30d provide cloud SaaS 64 services and/or non-cloud application services from general search engine services. In another embodiment, the cloud applications 30, 30a, 30b, 30c, 30d provide general search engine services by interacting with one or more other public search engines (e.g., GOOGLE, BING, YAHOO, etc.) and/or private search engine services.

In another embodiment, the applications 30, 30a, 30b, 30c, 30d provide cloud SaaS 64 services and/or non-cloud application services from specialized search engine services, such as vertical search engine services by interacting with one or more other public vertical search engines and/or private search engine services.

However, the present invention is not limited to such general and/or vertical search engine services and more, fewer and/or other general search engine services can be used to practice the invention.

Social Networking Services

In one embodiment, the applications 30, 30a, 30b, 30c, 30d provide cloud SaaS 64 services and/or non-cloud application services from one more social networking services including to/from one or more social networking web-sites (e.g., FACEBOOK, YOUTUBE, TWITTER, INSTAGRAM, etc.). The social networking web-sites also include, but are not limited to, social couponing sites, dating web-sites, blogs, RSS feeds, and other types of information web-sites in which messages can be left or posted for a variety of social activities.

However, the present invention is not limited to the social networking services described and other public and private social networking services can also be used to practice the invention.

Security and Encryption

Network devices 12, 14, 16, 20, 22, 24, 26, 31, 39, 98-104 with wired and/or wireless interfaces of the present invention include one or more of the security and encryptions techniques discussed herein for secure communications on the cloud communications network 18 or non-cloud communications network 18'.

Application programs 58 (FIG. 2) include security and/or encryption application programs integral to and/or separate from the applications 30, 30a, 30b, 30c, 30d. Security and/or encryption programs may also exist in hardware components on the network devices (12, 14, 16, 20, 22, 24, 26, 31, 39, 98-104) described herein and/or exist in a combination of hardware, software and/or firmware.

Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

RC4 is cipher designed by RSA Data Security, Inc. of Bedford, Massachusetts, which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i standard is based on 802.1x port-based authentication for user and device authentication. The 802.11i standard includes two main developments: Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES).

DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

RSA includes a public key encryption system which can be used both for encrypting messages and making digital signatures. The letters RSA stand for the names of the inventors: Rivest, Shamir and Adleman. For more information on RSA, see U.S. Pat. No. 4,405,829, now expired and incorporated herein by reference.

Elliptic Curve Digital Signature Algorithm (ECDSA) includes generating encryption keys derived from elliptic curve cryptography (ECC). Elliptic curve cryptography is a form of public key cryptography which is based on the algebraic structure of elliptic curves over finite fields. All participating devices have a pair of encryption keys called "private key" and "public key" generated by ECC. The Federal Information Processing Standards (FIPS) Digital Signature Standards, FIPS 186-3, 186-4 and 186-5, including ECDSA are incorporated herein by reference.

Digital Signature Algorithm (DSA) includes a public-key cryptosystem and Federal Information Processing Standard for digital signatures, based on the mathematical concept of modular exponentiation and the discrete logarithm problem. DSA is a variant of the Schnorr and ElGamal digital signature schemes. FIPS 186-3, 186-4 and 186-5, including DSA are incorporated herein by reference.

A "digital signature" is a mathematical scheme for verifying the authenticity of digital messages or documents. A valid digital signature, where the prerequisites are satisfied, gives a recipient very strong reason to believe that electronic information (e.g., electronic file, hash value, etc.) was created by a known sender (i.e., is authentic, etc.), and that electronic information was not altered in transit (i.e., has integrity, etc.).

Digital signatures are a standard element of most cryptographic protocol suites, and are commonly used where it is important to verify electronic information, detect forgery and/or tampering.

Digital signatures are often used to implement personal electronic signatures, which includes any electronic data that carries the intent of a personal signature as created by a person. However, not all digital signatures include personal signatures for a person.

"Hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length$<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

SHA-256 is one of the successor hash functions to SHA-1 (collectively referred to as SHA-2), and is one of the strongest hash functions available. SHA-256 is not much more complex to code than SHA-1, and has not yet been compromised in any way. The 256-bit key makes it a good partner-function for AES. It is defined in the NIST (National Institute of Standards and Technology) standard FIPS 180-4, which is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

Providing a way to check the integrity of information transmitted over or stored in an unreliable medium such as a wireless network is a prime necessity in the world of open computing and communications. Mechanisms that provide such integrity check based on a secret key are called "message authentication codes" (MAC). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc., in combination with a secret shared key. The cryptographic strength of HMAC depends on the properties of the underlying hash function. The IETF RFC-2101, entitled "HMAC: Keyed-Hashing for Message Authentication" is incorporated here by reference.

A Merkle tree is a tree data structure in which every leaf node is labelled with a cryptographic hash (e.g., MD5, SHA-1, SHA-512, HMAC, etc.) of a data block, and every non-leaf node is labelled with a cryptographic hash of labels of its child nodes. A Merkle tree is a hash-based data structure that is a generalization of a hash list. It is a tree structure in which each leaf node is a hash of a block of data, and each non-leaf node is a hash of its children. Typically, Merkle trees have a branching factor of two, meaning that each node has up to two children. A Merkle tree stores all transactions in a block of a blockchain by producing a digital fingerprint of an entire set of transactions. It allows a user to verify whether a transaction can be included in a blockchain block or not. Merkle trees are created by repeatedly calculating hashing pairs of nodes until there is only one hash left. Merkle Trees benefit both users and miners on a blockchain. Users can verify individual parts of blocks, and can also check transactions by using hashes from other branches of the Merkle tree. Miners can calculate hashes progressively as they receive transactions from their peers.

An Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

The HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

The SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security methods are negotiated between the source and destination at the start of establishing a protocol session. The SSL 2.0 protocol specification, by Kipp E. B. Hickman, 1995 is incorporated herein by reference. More information on SSL is available at the domain name See "netscape.com/eng/security/SSL_2.html."

Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

In one embodiment, the security functionality includes Cisco Compatible EXtensions (CCX). CCX includes security specifications for makers of 802.11xx wireless LAN chips for ensuring compliance with Cisco's proprietary wireless security LAN protocols. As is known in the art, Cisco Systems, Inc. of San Jose, California is supplier of networking hardware and software, including router and security products.

However, the present invention is not limited to such security and encryption methods described herein and more, fewer and/or other types of security and encryption methods can be used to practice the invention. The security and encryption methods described herein can also be used in various combinations and/or in different layers of the protocol stack 38 with each other.

Cloud Computing Networks

Figure 4:
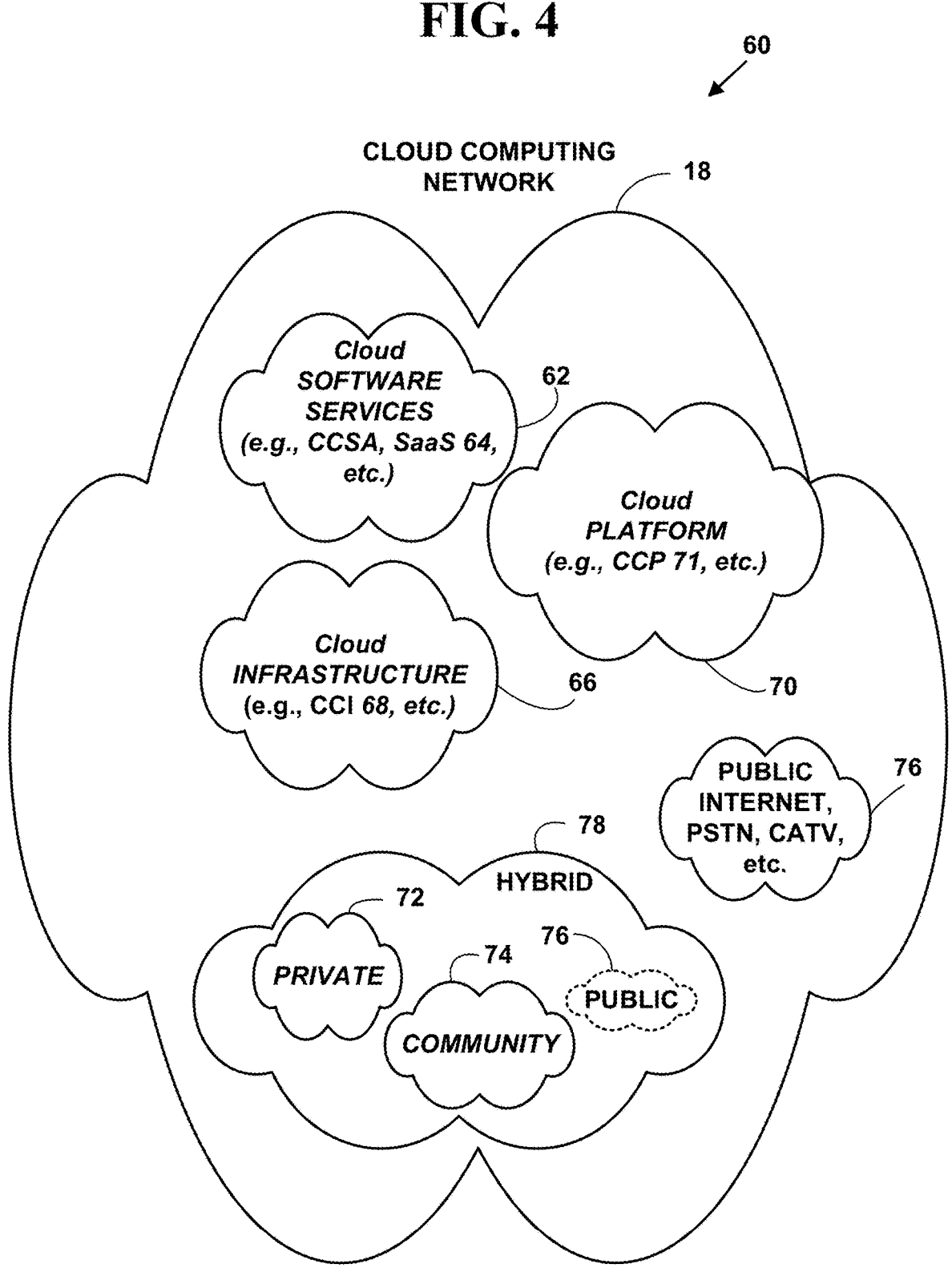
FIG. 4 is block diagram illustrating an exemplary cloud communications network.

FIG. 4 is a block diagram 60 illustrating an exemplary cloud computing network 18.

The cloud computing network 18 is also referred to as a "cloud communications network" 18. However, the present invention is not limited to this cloud computing model and other cloud computing models can also be used to practice the invention. The exemplary cloud communications network includes both wired and/or wireless components of public and private networks.

In one embodiment, the cloud computing network 18 includes a cloud communications network 18 comprising plural different cloud component networks 72, 74, 76, 78. "Cloud computing" is a model for enabling, on-demand network access to a shared pool of configurable computing resources (e.g., public and private networks, servers, storage, applications, and services) that are shared, rapidly provisioned and released with minimal management effort or service provider interaction.

This exemplary cloud computing model for electronic information retrieval promotes availability for shared resources and comprises: (1) cloud computing essential characteristics; (2) cloud computing service models; and (3) cloud computing deployment models. However, the present invention is not limited to this cloud computing model and other cloud computing models can also be used to practice the invention.

Exemplary cloud computing essential characteristics appear in Table 1. However, the present invention is not limited to these essential characteristics and more, fewer or other characteristics can also be used to practice the invention.

TABLE 1

1. On-demand automatic electronic digital document security services. Automatic electronic digital document security processing and display system processing services can unilaterally provision computing capabilities, such as server time and network storage, as needed automatically without requiring human interaction with each network server on the cloud communications network 18.
2. Broadband network access. Automatic electronic digital document security processing and display system services capabilities are available over plural broadband communications networks and accessed through standard mechanisms that promote use by heterogeneous thin or thick client platforms (e.g., mobile phones, smart phones 14, tablet computers 12, laptops, PDAs, etc.). The broadband network access includes high speed network access such as 3G, 4G and 5G wireless and/or wired and broadband and/or ultra-broad band (e.g., WiMAX, etc.) network access.
3. Resource pooling. Automatic electronic digital document security processing and display system services resources are pooled to serve multiple requesters using a multi-tenant model, with different physical and virtual resources dynamically assigned and reassigned according to demand. There is location independence in that a requester of services has no control and/or knowledge over the exact location of the provided by the automatic electronic digital document security processing and display system service resources but may be able to specify location at a higher level of abstraction (e.g., country, state, or data center). Examples of pooled resources include storage, processing, memory, network bandwidth, virtual server network device and virtual target network devices.
4. Rapid elasticity. Capabilities can be rapidly and elastically provisioned, in some cases automatically, to quickly scale out and rapidly released to quickly scale for automatic electronic digital document security processing and display system service collaboration. For automatic electronic digital document security processing and display system services, multi-media collaboration converters, the automatic electronic digital document security processing and display system services collaboration and analytic conversion capabilities available for provisioning appear to be unlimited and can be used in any quantity at any time.
5. Measured Services. Cloud computing systems automatically control and optimize resource use by leveraging a metering capability at some level of abstraction appropriate to the type of automatic electronic digital document security processing and display system services (e.g., storage, processing, bandwidth, custom electronic content retrieval applications, etc.). Electronic automatic electronic digital document security processing and display system collaboration conversion usage is monitored, controlled, and reported providing transparency for both the automatic electronic digital document security processing and display system provider and the automatic electronic digital document security processing and display system service requester of the utilized electronic content storage retrieval service.

Exemplary cloud computing service models illustrated in FIG. 4 appear in Table 2. However, the present invention is not limited to these service models and more, fewer or other service models can also be used to practice the invention.

TABLE 2

1. Cloud Computing Software Applications 62 for automatic electronic digital document security services (CCSA, SaaS 64). The capability to use the provider's applications 30, 30a, 30b, 30c, 30d running on a cloud infrastructure 66. The cloud computing applications 62, are accessible from the server network device 20 from various client devices 12, 14, 16, 31, 39, 98-104 through a thin client interface such as a web browser, etc. The user does not manage or control the underlying cloud infrastructure 66 including network, servers, operating systems, storage, or even individual application 30, 30a, 30b, 30c, 30d capabilities, with the possible exception of limited user-specific application configuration settings.
2. Cloud Computing Infrastructure 66 for automatic electronic digital document security services (CCI 68). The capability provided to the user is to provision processing, storage and retrieval, networks 18, 72, 74, 76, 78 and other fundamental computing resources where the consumer is able to deploy and run arbitrary software, which can include operating systems and applications 30, 30a, 30b, 30c, 30d. The user does not manage or control the underlying cloud infrastructure 66 but has control over operating systems, storage, deployed applications, and possibly limited control of select networking components (e.g., host firewalls, etc.).
3. Cloud Computing Platform 70 for automatic electronic digital document security services (CCP 71). The capability provided to the user to deploy onto the cloud infrastructure 66 created or acquired applications created using programming languages and tools supported servers 20, 22, 24, 26, etc.. The user not manage or control the underlying cloud infrastructure 66 including network, servers, operating systems, or storage, but has control over the deployed applications 30a, 30b, 30c, 30d and possibly application hosting environment configurations.

Exemplary cloud computing deployment models appear in Table 3. However, the present invention is not limited to these deployment models and more, fewer or other deployment models can also be used to practice the invention.

TABLE 3

1. Private cloud network 72. The cloud network infrastructure is operated solely for the automatic electronic digital document security processing and display system services. It may be managed by the electronic content retrieval or a third party and may exist on premise or off premise.
2. Community cloud network 74. The cloud network infrastructure is shared by several different organizations and supports a specific electronic content storage and retrieval community that has shared concerns (e.g., mission, security requirements, policy, compliance considerations, etc.). It may be managed by the different organizations or a third party and may exist on premise or off premise.
3. Public cloud network 76. The cloud network infrastructure such as the Internet, PSTN, SATV, CATV, Internet TV, etc. is made available to the general public or a large industry group and is owned by one or more organizations selling cloud services.
4. Hybrid cloud network 78. The cloud network infrastructure 66 is a composition of two and/or more cloud networks 18 (e.g., private 72, community 74, and/or public 76, etc.) and/or other types of public and/or private networks (e.g., intranets, etc.) that remain unique entities but are bound together by standardized or proprietary technology that enables data and application portability (e.g., cloud bursting for load-balancing between clouds, etc.)

Cloud software 64 for electronic content retrieval takes full advantage of the cloud paradigm by being service oriented with a focus on statelessness, low coupling, modularity, and semantic interoperability for electronic content retrieval. However, cloud software services 64 can include various states.

Cloud storage of desired electronic content on a cloud computing network includes agility, scalability, elasticity and multi-tenancy. Although a storage foundation may be comprised of block storage or file storage such as that exists on conventional networks, cloud storage is typically exposed to requesters of desired electronic content as cloud objects.

In one exemplary embodiment, the applications 30, 30a, 30b, 30c, 30d, offers cloud services for automatic digital document security processing and display system services. The application 30, 30a, 30b, 30c, 30d offers the cloud computing Infrastructure 66, 68 as a Service 62 (IaaS), including a cloud software infrastructure service 62, the cloud Platform 70, 71 as a Service 62 (PaaS) including a cloud software platform service 62 and/or offers Specific cloud software services as a Service 64 (SaaS) including a specific cloud software service 64 for automatic electronic digital document security processing and display system services. The IaaS, PaaS and SaaS include one or more of cloud services 62 comprising networking, storage, server network device, virtualization, operating system, middleware, run-time, data and/or application services, or plural combinations thereof, on the cloud communications network 18.

Figure 5:
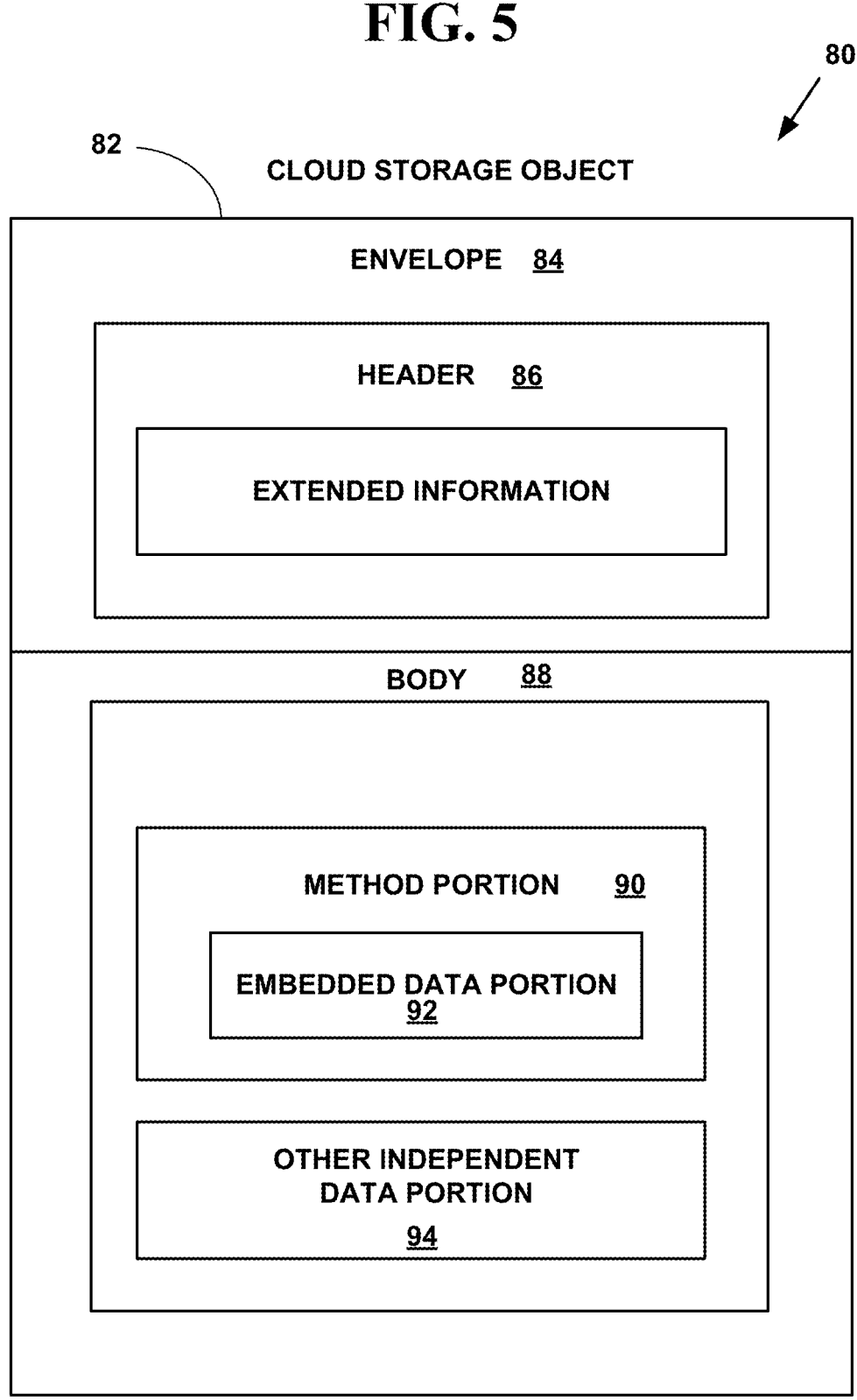
FIG. 5 is a block diagram illustrating an exemplary cloud storage object.

FIG. 5 is a block diagram 80 illustrating an exemplary cloud storage object 82.

One or more server network devices (e.g., 20, 22, 24, 26, etc.) store portions 13', 15' of the electronic message content 13, 15 (e.g., SMS, RCS, etc.) as cloud storage objects 82 (FIG. 5) as is described herein.

The cloud storage object 82 includes an envelope portion 84, with a header portion 86, and a body portion 88. However, the present invention is not limited to such a cloud storage object 82 and other cloud storage objects and other cloud storage objects with more, fewer or other portions can also be used to practice the invention.

The envelope portion 84 uses unique namespace Uniform Resource Identifiers (URIs) and/or Uniform Resource Names (URNs), and/or Uniform Resource Locators (URLs) unique across the cloud communications network 18 to uniquely specify, location and version information and encoding rules used by the cloud storage object 82 across the whole cloud communications network 18. For more information, see IETF RFC-3305, Uniform Resource Identifiers (URIs), URLs, and Uniform Resource Names (URNs), the contents of which are incorporated by reference.

The envelope portion 84 of the cloud storage object 82 is followed by a header portion 86. The header portion 86 includes extended information about the cloud storage objects such as authorization and/or transaction information, etc.

The body portion 88 includes methods 90 (i.e., a sequence of instructions, etc.) for using embedded application-specific data in data elements 92. The body portion 88 typically includes only one portion of plural portions of application-specific data 92 and independent data 94 so the cloud storage object 82 can provide distributed, redundant fault tolerant, security and privacy features described herein.

Cloud storage objects 82 have proven experimentally to be a highly scalable, available and reliable layer of abstraction that also minimizes the limitations of common file systems. Cloud storage objects 82 also provide low latency and low storage and transmission costs.

Cloud storage objects 82 are comprised of many distributed resources, but function as a single storage object, are highly fault tolerant through redundancy and provide distribution of desired electronic content across public communication networks 76, and one or more private networks 72, community networks 74 and hybrid networks 78 of the cloud communications network 18. Cloud storage objects 82 are also highly durable because of creation of copies of portions of desired electronic content across such networks 72, 74, 76, 78 of the cloud communications network 18. Cloud storage objects 82 includes one or more portions of desired electronic content and can be stored on any of the 72, 74, 76, 78 networks of the cloud communications network 18. Cloud storage objects 82 are transparent to a requester of desired electronic content and are managed by cloud applications 30, 30a, 30b, 30c, 30d.

In one embodiment, cloud storage objects 82 are configurable arbitrary objects with a size up to hundreds of terabytes, each accompanied by with a few kilobytes of metadata. Cloud objects are organized into and identified by a unique identifier unique across the whole cloud communications network 18. However, the present invention is not limited to the cloud storage objects described, and more fewer and other types of cloud storage objects can be used to practice the invention.

Cloud storage objects 82 present a single unified namespace or object-space and manages desired electronic content by user or administrator-defined policies storage and retrieval policies. Cloud storage objects includes Representational state transfer (REST), Simple Object Access Protocol (SOAP), Lightweight Directory Access Protocol (LDAP) and/or Application Programming Interface (API) objects and/or other types of cloud storage objects. However, the present invention is not limited to the cloud storage objects described, and more fewer and other types of cloud storage objects can be used to practice the invention.

REST is a protocol specification that characterizes and constrains macro-interactions storage objects of the four components of a cloud communications network 18, namely origin servers, gateways, proxies and clients, without imposing limitations on the individual participants.

SOAP is a protocol specification for exchanging structured information in the implementation of cloud services with storage objects. SOAP has at least three major characteristics: (1) Extensibility (including security/encryption, routing, etc.); (2) Neutrality (SOAP can be used over any transport protocol such as HTTP, SMTP or even TCP, etc.), and (3) Independence (SOAP allows for almost any programming model to be used, etc.)

LDAP is a software protocol for enabling storage and retrieval of electronic content and other resources such as files and devices on the cloud communications network 18. LDAP is a "lightweight" version of Directory Access Protocol (DAP), which is part of X.500, a standard for directory services in a network. LDAP may be used with X.509 security and other security methods for secure storage and retrieval. X.509 is public key digital certificate standard developed as part of the X.500 directory specification. X.509 is used for secure management and distribution of digitally signed certificates across networks.

An API is a particular set of rules and specifications that software programs can follow to communicate with each other. It serves as an interface between different software programs and facilitates their interaction and provides access automatic electronic digital document security processing and display system services in a cloud or non-cloud environment. In one embodiment, the API for automatic electronic digital document security processing and display system services is available to network devices 12, 14, 16, 20, 22, 24, 26, 31, 39, 98-104 and networks 18, 18'. However, the present invention is not limited to such an embodiment and other embodiments can be used to practice the invention.

Wearable Devices

Wearable technology" and/or "wearable devices" are clothing and accessories incorporating computer and advanced electronic technologies. Wearable network devices provide several advantages including, but not limited to: (1) Quicker access to notifications. Important and/or summary notifications are sent to alert a user to view the whole message. (2) Heads-up information. Digital eye wear allows users to display relevant information like directions without having to constantly glance down; (3) Always-on Searches. Wearable devices provide always-on, hands-free searches; and (4) Recorded data and feedback. Wearable devices take telemetric data recordings and providing useful feedback for users for exercise, health, fitness, etc. activities.

Figure 6:
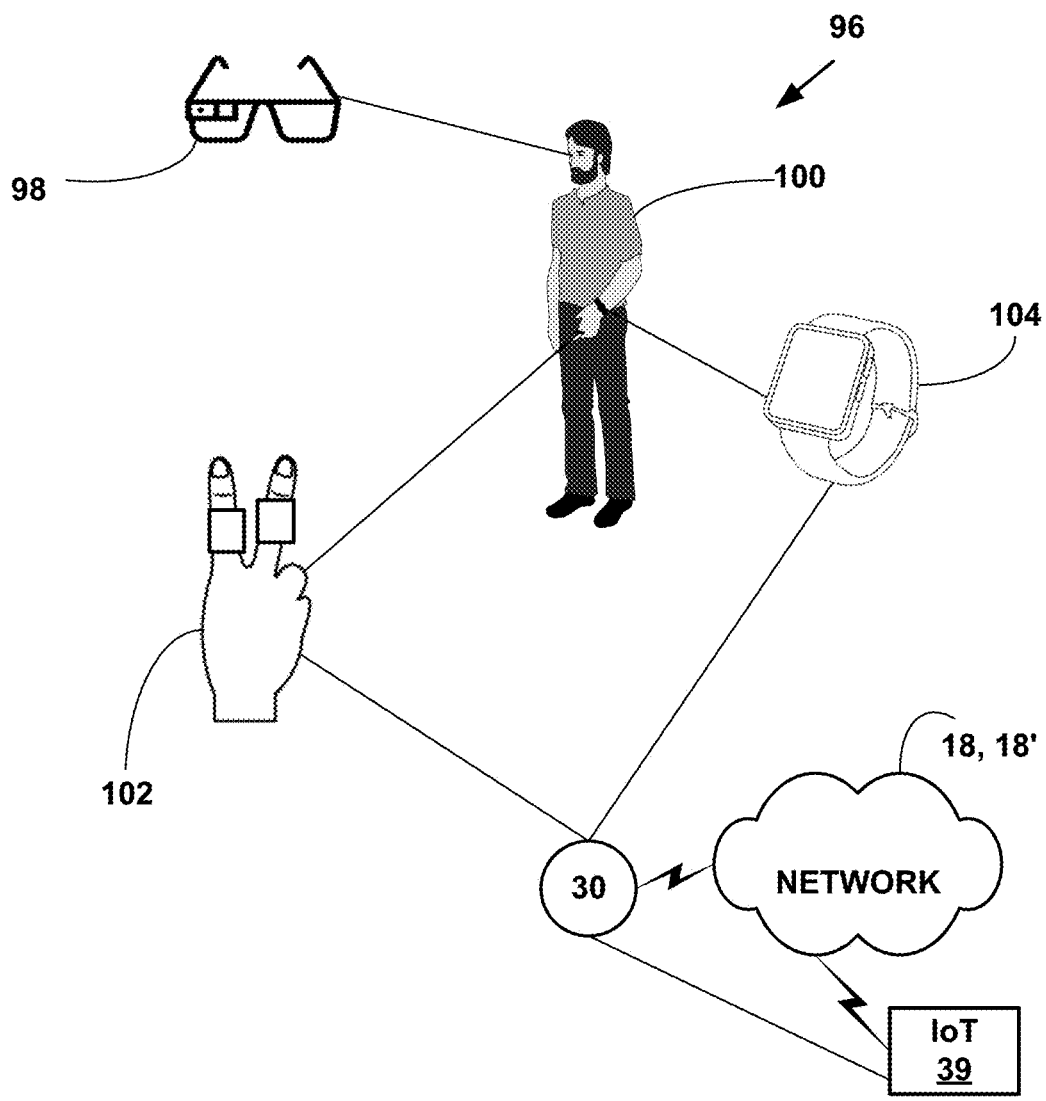
FIG. 6 is a block diagram illustrating wearable network devices.

FIG. 6 is a block diagram with 96 illustrating wearable devices.

The wearable devices include one or more processors and include, but are not limited to, wearable digital glasses 98, clothing 100, jewelry 102 (e.g., smart rings, smart earrings, etc.) and/or watches 104. However, the present invention is not limited to such embodiments and more, fewer and other types of wearable devices can also be used to practice the invention.

In one specific embodiment, the application 30, 30*a*, 30*b*, 30*c*, 30*d* interacts with wearable devices 98-104 an automatic electronic digital document security processing and display system services the methods described herein However, the present invention is not limited this embodiment and other embodiments can also be used to practice the invention.

Artificial Intelligence (AI) and Big Data

"Artificial intelligence" (AI), also known as machine intelligence (MI), is intelligence demonstrated by machines, in contrast to the natural intelligence (NI) displayed by humans and other animals. AI research is defined as the study of "intelligent agents." Intelligent agents are any software application or hardware device that perceives its environment and takes actions that maximize its chance of successfully achieving its goals. Colloquially, the term "artificial intelligence" is applied when a machine mimics "cognitive" functions that humans associate with human brains, such as learning, problem solving and comparing large number of data points.

In one embodiment, the present invention uses one or more AI methods including, but are not limited to, AI knowledge-based methods 30*c* for electronic blockchain file processing. However, the present invention is not limited to such an embodiment and more, fewer and/or other AI methods can be used to practice the invention.

In one embodiment, SaaS 64 includes and AI application 30*c* with the AI methods described herein. In another embodiment, the AI application 30*c* is a standalone application. However, the present invention is not limited to such an embodiment, and the AI application 30*c* can be provided in other than the SaaS 64.

"Big Data" refers to the use of predictive analytic methods that extract value from data, and to a particular size of data set. The quantities of data used are very large, at least 100,000 data points and more typically 500,000 to 1 Million+ data points. Analysis of Big Data sets are used to find new correlations and to spot trends. In one embodiment, SaaS 64 includes and Big Data application 30*d* with the Big Data described herein.

In one embodiment, the AI methods described herein collect data information to create and store (e.g., in cloud storage object 82, etc.) a Big Data that is used to analyze trends find new correlations and to spot trends. However, the present invention is not limited to such an embodiment and the AI methods described herein can be used without Big Data sets.

Short Message Service (SMS) Messaging

Short Message Service (SMS) is an electronic text messaging service component of phone, Web, or mobile communication systems. It uses standardized communications protocols to allow fixed line or mobile phone devices to exchange short text messages.

SMS messages were defined in 1985 as part of the Global System for Mobile Communications (GSM) series of standards as a means of sending messages of up to 160 characters to and from GSM mobile handsets. Though most SMS messages are mobile-to-mobile text messages, support for the service has expanded to include other mobile technologies as well as satellite and landline networks.

The SMS Internet Engineering Task Force (IETF) Request for Comments (RFC) 5724, ISSN: 2070-1721, 2010, is incorporated herein by reference.

Rich Communication Suite (RCS)

Rich Communications Suite/Rich Communications System (RCS) is a communication protocol between mobile telephone carriers, between phones and carriers, and between individual devices aiming at replacing SMS messages with a message system that is richer, provides phonebook polling (e.g., for service discovery, etc.), and can transmit in-call multimedia. It is also marketed under the names of Advanced Messaging, Advanced Communications, Chat, joyn, Message+ and SMS+. RCS is also a communication protocol available for device-to-device (D2D) exchanges without using a telecommunications carrier for devices that are in close physical proximity (e.g., between two IoT devices, smart phones, smart phone and electronic tablet, etc.)

One advantage RCS Messaging has over SMS is that RCS enables users to send rich, verified messages including photos, videos and audio messages, group messages, read receipts, indicators to show other users are typing a message, carousel messages, suggested chips, chat bots, barcodes, location integration, calendar integration, dialer integration, and other RCS messaging features. RCS messaging includes person-to-person (P2P), application-to-person (A2P), application-to-application (A2A), application-to-device (A2D) and/or device-to-device (D2D) messaging.

The RCS Interworking Guidelines Version 14.0, 13 Oct. 2017, GSM Association, Rich Communication Suite RCS API Detailed Requirements, version 3.0, Oct. 19, 2017, Rich Communication Suite 8.0 Advanced Communications Services and Client Specification Version 9.0, 16 May 2018, RCS Universal Profile Service Definition Document Version 2.2, 16 May 2018, and Rich Communication Suite Endorsement of OMA CPM 2.2 Conversation Functions Version 9.0, 16 Oct. 2019, are all incorporated herein by reference.

The Rich Communication Suite-Enhanced (RCS-e) includes methods of providing first stage interoperability among Mobile Network Operators (MNOs). RCS-e is a later version of RCS which enables mobile phone end users to use instant messaging (IM), live video sharing and file transfer across any device on any MNO.

The RCS functionality of the present invention includes, but is not limited to, one and two way, rich, verified, multimedia messages including photos, videos and audio messages, group messages, read receipts, indicators to show other users are typing a message, predefined quick-reply suggestions, rich cards, carousels, action buttons, maps, click-to-call, calendar integration, geo-location, etc. The RCS functionality also includes RCS emulators and/or thin RCS applications that provide full and/or selected features of available RCS functionality. A RCS message application and the RCS interoperability application provides full and/or partial RCS functionality including, but not limited to, RCS-e functionality.

BlockChains

A "blockchain" is a public ledger of all transactions that have ever been executed. It is constantly growing as completed blocks are added to it with a new set of recordings. The blocks are added to the blockchain in a linear, chronological order. Blockchains are used on Peer-2-Peer (P2P) networks and other networks such as cloud communications networks. Each P2P node gets a copy of the blockchain, which gets downloaded automatically upon joining P2P.

The blockchain has complete information about the block owners and block content right from the first block to the most recently completed block.

A "blockchain is also a digital ledger that records every transaction that has ever occurred. Blockchains and transactions on blockchains are typically protected by cryptography. More importantly, though, the blockchain does not reside in a single server, but across a distributed network of servers and computer such as a cloud computing network and a P2P computing network. Accordingly, whenever new transactions occur, a new blockchain is authenticated across this distributed network, then the transaction is included as a new "block" on the "chain." A block chain implementation comprises of two kinds of records: transactions and blocks.

"Transactions" are the content to be stored in the block chain (e.g., financial transactions, etc.). Transactions are created by participants using the system. In the case of cryptocurrencies, a transaction is created any time a cryptocurrency owner sends cryptocurrency to someone.

A transaction is also a transfer of value between digital wallets that gets included in the block chain. Digital wallets, including BITCOIN wallets, store a secret piece of data called a "private key" or, which is used to digitally sign transactions, providing a mathematical proof that the digital signature has actually come from the owner of the digital wallet.

System users create transactions that are passed from node to node on a best-effort basis. The system implementing the blockchain defines a valid transaction. In cryptocurrency applications, a valid transaction must be digitally signed, spend one or more unspent outputs of previous transactions, and the sum of transaction outputs must not exceed the sum of inputs.

Blocks record and confirm when and in what sequence transactions enter and are logged in the block chain. Blocks are created by users known as "miners" who use specialized software or equipment designed specifically to create blocks.

In a cryptocurrency system, miners are incentivized to create blocks to collect two types of rewards: a pre-defined per-block award, and fees offered within the transactions themselves, payable to any miner who successfully confirms the transaction.

BITCOIN is a digital cryptocurrency created in 2009. It follows the ideas set out in a white paper by Satoshi Nakamoto, whose true identity has yet to be verified. Bitcoin offers the promise of lower transaction fees than traditional online payment mechanisms and is operated by a decentralized authority, unlike government issued currencies. The 2009, whitepaper entitled, Bitcoin: A Peer-to-peer electronic cash system, by Satoshi Nakamato, bitcoin.org, is incorporated herein by reference.

There are no physical BITCOINS, only balances associated with public and private keys. These balances are kept on a public ledger, a blockchain, along with all BITCOIN transactions, that is verified by a massive amount of computing power. A BITCOIN is defined as a chain of digital signatures. Each owner transfers the BITCOIN to a next owner by digitally signing a hash a previous transaction and the public key of a next owner and adding these to the end of the BITCOIN.

BITCOIN and other blockchains use a pre-determined hash algorithm to turn an arbitrarily-large amount of data into a fixed-length hash. The same hash will always result from the same data, but modifying the data by even one bit will completely change the hash. Like all computer data, hashes are large numbers, and are usually written as hexadecimal.

BitCoin uses the SHA-256 hash algorithm described herein to generate verifiably "random" numbers in a way that requires a predictable amount of CPU effort.

BITCOIN balances are kept using public and private encryption "keys," which are long strings of numbers and letters linked through the mathematical encryption algorithm that was used to create them. The "public key" (e.g., analogous to an account number) serves as an address which is published to the world and to which others may send a BITCOIN. The "private key" (e.g., analogous to a secret private PIN, password, etc.) is meant to be a guarded secret, and only used to authorize BITCOIN transmissions. Private BITCOIN keys of BITCOIN blocks are stored in digital wallets.

Blockchains are decentralized and do not require a "central authority" or "middleman." Every node in a decentralized system has a copy of the block chain. This avoids the need to have a centralized database managed by a trusted third party. Blockchain transactions are broadcast to a network using software applications. Network nodes can validate transactions, add them to their copy and then broadcast these additions to other nodes. To avoid the need for a trusted third party to timestamp transactions, decentralized block chains use various timestamping schemes, such as proof-of-work.

Figure 7:
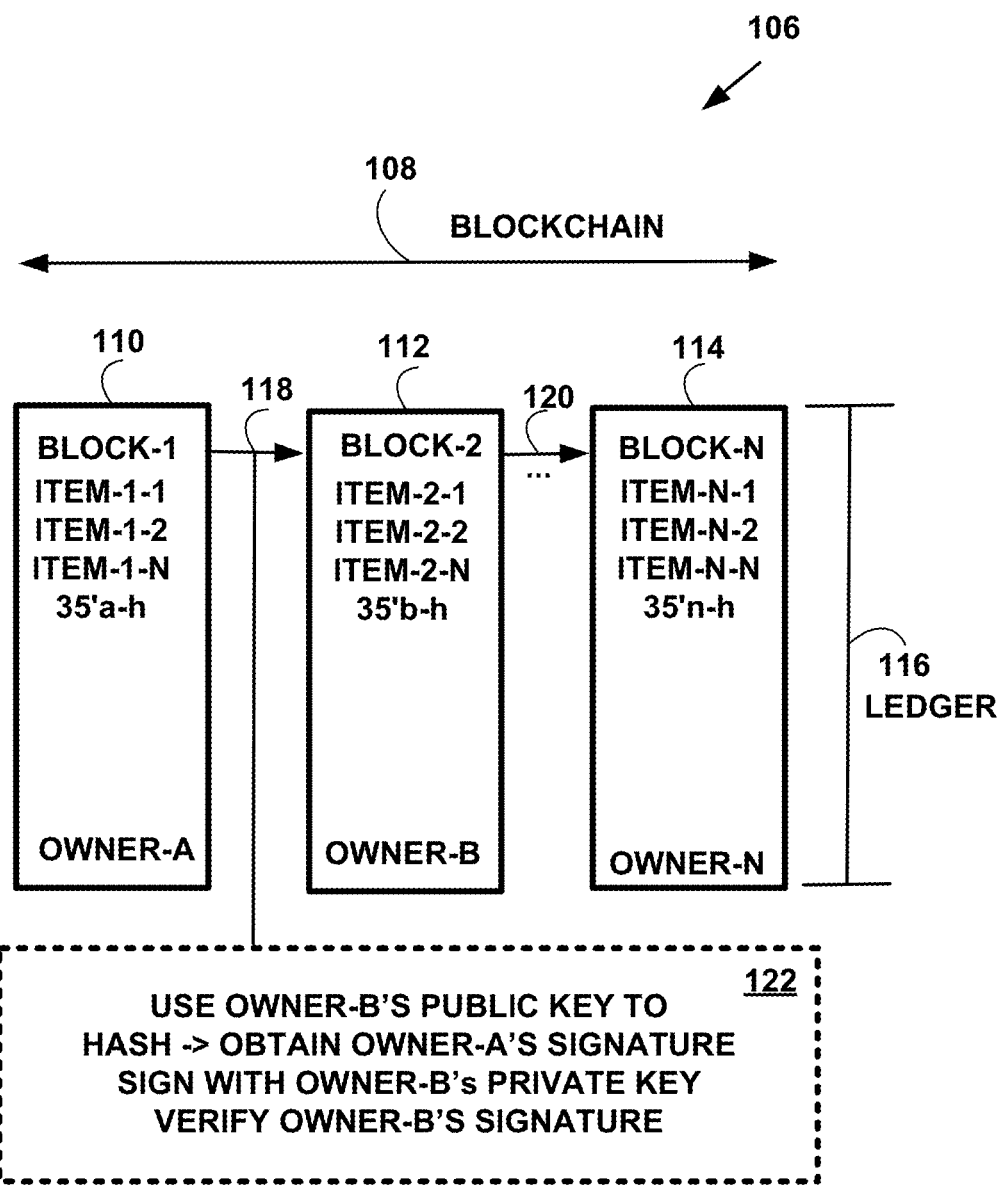
FIG. 7 is a block diagram illustrating an exemplary blockchain.

FIG. 7 is a block diagram 106 illustrating an exemplary blockchain 108.

The core advantages of the blockchain 108 architecture include, but are not limited to those described in Table 4.

TABLE 4

In a blockchain 108 the ability for independent nodes to converge on a consensus of the latest version of a large data set such, as a ledger 116, even when the nodes are run anonymously, have poor interconnectivity and have operators who are dishonest or malicious.
The ability for any well-connected node to determine, with reasonable certainty, whether a transaction does or does not exist in the data set.
The ability for any node that creates a transaction to, after a confirmation period, determine with a reasonable level of certainty whether the transaction is valid, able to take place and become final (i.e., that no conflicting transactions were confirmed into the block chain elsewhere that would invalidate the transaction, such as the same currency units "double-spent" somewhere else).
A prohibitively high cost to attempt to rewrite or alter transaction history.
Automated conflict resolution that ensures that conflicting transactions (such as two or more attempts to spend the same balance in different places) never become part of the confirmed data set.

A "digital wallet" is a software program where blockchains are stored. A digital wallet stores a private encryption key for every blockchain address that is saved in the digital wallet of the person who owns the balance. Digital wallets facilitate sending and receiving blockchains and gives ownership of the blockchain balance, if it includes financial information such as BITCOINS, to a user.

A digital wallet stored on a communications network, allows a user to use blockchains (e.g., BITCOINS, etc.) from anywhere, on any browser and/or any mobile network device and/or any smart network device and/or any wearable network device. Storing a digital wallet must be done carefully since it stores private encryption keys for the blockchains online.

A "blockchain" 108 is a chronologically updated and distributed digital record that comes with cryptographic protection. It can be compared to a linear chain of blocks where every block stores information and is connected to another block and the entire network is shared among the participants. This chain of blocks 110, 112, 114, is called a "ledger," 116 records and houses the data that is transferred amongst the participants. Each of the participants in this shared network is able to see the original information. After data is entered into a blockchain block 110, 112, 114 in a blockchain ledger 116 it cannot be deleted. Every block 110, 112, 114 in the blockchain 108 has a permanent timestamp that indicates authentication and verification.

The blockchain 108 allows the creation and use of universal electronic blockchain file processing with transparency, authentication, verification and fraud prevention.

The blockchain 108 includes plural blocks 110, 112, 114 (only three of which are illustrated for simplicity) in a blockchain ledger 116 which include one or more items, and plural transactions 118, 120 (only two of which are illustrated for simplicity). Exemplary transaction 118 includes, for example, includes taking Owner-B's public key for block 112 in blockchain 108, running it through a hash algorithm 122 (e.g., SHA-256, etc.) and obtaining Owner-A's digital signature, Owner-B signs the block 112 with its private key and Owner-B's signature is verified on the next block 114, etc. Transaction 120 includes identical steps as was illustrated in transaction 118. However, the present invention is not limited to this embodiment, and more fewer or other exemplary blockchain transactions can be used to practice the invention.

Secure Digital Documents using Quick Response (QR) Codes

The present invention relates to a robust digital system designed for the issuance and verification of tamper-proof digital certificates and digital documents. Secure digital document are created by embedding a Quick Response QR Code (QR code defined by the ISO/IEC 18004:2015 standard, etc.) within each digital document, wherein the QR code incorporates a modified digital image (e.g., a digital picture, a "selfie" etc.) of the recipient for law enforcement record checks and/or a logo of the issuing authority for certificates such as attendance, achievement, completion, and skill acquisition.

The QR code further encompasses essential certificate data and a cryptographic digital signature and/or a blockchain cryptographic digital signature. The integration of the QR code ensures the authenticity, integrity, and non-repudiation of the documents.

For police record checks, the digital image (e.g., mug shot, digital picture, selfie, etc.) of the recipient serves as an additional layer of identification and authentication. The issuer's logo in other certificates represents the legitimacy of the issuing authority.

The cryptographic digital signature within the QR code is derived through advanced cryptographic algorithms and the hashing of document contents, providing safeguards against tampering.

The system comprises a secure issuance platform accessible by authorized entities and a verification interface accessible through various mediums, including mobile devices. The verification interface utilizes QR code scanning technology to validate the integrity and authenticity of the documents by cross-verifying the embedded digital signature against the issuing authority's public encryption key.

This dynamic dual-purpose system is used across different domains such as law enforcement, education, and corporate training, providing an efficient, secure, and innovative solution for issuing and verifying critical documents and certificates. The invention's modular architecture allows for seamless scalability and adaptability, involving evolving technological advancements and diversified application scenarios.

FIGS. 8A-8B are a flow diagram illustrating a Method 124 digital document security processing.

In FIG. 8A at Step 126, preparing on a security application on a server network device with one or more processors, a digital certificate in a predetermined template, the predetermined template including plural general information fields and personalized information fields. At Step 128, obtaining on the security application on the server network device a digital picture to be used on the digital certificate from a second network device with one or more processors via a communications network. At Step 130, applying a pixelation method on the security application on the server network device to the obtained digital picture, the pixilation method decomposing the digital picture into a plurality of constituent pixels, creating a pixelated digital picture. At Step 132, applying an image contrasting method on the security application on the server network device to the pixelated digital picture, the contrasting method adjusting a contrast of the pixelated digital picture ensuring the pixelated digital picture remains recognizable in a small digital format or densely packed digital format. At Step 134, applying a sizing and cropping method on the security application on the server network device to the pixelated digital picture, the sizing and cropping method includes resizing and cropping to fit within a predetermined dimensions of a Quick Response (QR) code of a desired size and maintaining an aspect ratio preventing any distortion of an image in the pixelated digital picture. In FIG. 8B at Step 136, generating the QR code on the security application on the server network device of the desired size based on information in the digital certificate, the QR code including error correction information and QR code decoding information. At Step 138, embedding with a steganography method on the security application on the server network device, the pixelated digital picture within the QR code, the steganography method including concealing information security information from the digital certificate and the error correction information in the QR code. At Step 140, creating a secure digital document including the digital certificate and the QR code including the pixelated digital picture on the security application on the server network device, the secure digital document providing a personalized tamperproof secure digital document, the secure digital document further providing automatic verification of the secure digital document upon scanning of the QR code including the pixelated digital picture, the scanning of the QR code from the secure digital document returning electronic information for automatically verifying an image in the digital picture and electronic information stored in the digital certificate.

Method 124 is illustrated with an exemplary embodiment. However the present invention is not limited to such an embodiment and other embodiments can also be used to practice the invention.

In such an exemplary embodiment, in FIG. 8A at Step 126, preparing on a security application 30a on a server network device 20, 22, 24, 24 with one or more processors, a digital certificate 35 in a pre-determined template 27, the pre-determined template 27 including plural general information fields and personalized information fields including electronic information 13, 15, 17.

In one embodiment the general information fields include, but are not limited to, a time, date, document number, document description, etc. However, the present invention is not limited to such an embodiment and more fewer and other types of information can be included in the general information fields.

In one embodiment the personalized information fields, include but are not limited to, name, address, date of birth, social security number, telephone number, personal document number (e.g., arrest record number, traffic ticket number, etc.), etc. However, the present invention is not limited to such an embodiment and more fewer and other types of information can be included in the general information fields.

In one embodiment, an Artificial Intelligence (AI) application 30c on security application 30a on the server network device 20, 22, 24, 26 for automatic secure digital document processing from the security application 30a on the server network device 20, 22, 24, 26 with one or more AI applications for completing all steps of Method 124 of FIG. 8. However, the present invention is not limited to such an embodiment and more fewer and other types of information can be included in the general information fields.

At Step 128, obtaining on the security application 30a on the server network device 20 a digital picture 41 to be used on the digital certificate 35 from a second network device 12, 14, 16, 31, 39, 98-104 with one or more processors via a communications network 18, 18'.

In one embodiment, the digital picture 41 includes a digital picture of a digital picture of a human, animal, building, land, company logo, government seal, school, college or university seal, or a corporate seal and/or other type of picture. However, the present invention is not limited to such embodiments and other types of digital pictures may be used to practice the invention.

In one embodiment, the digital picture 41 includes a new "selfie" captured with a camera component on the second network device 12, 14, 16, 39, 98-104. In another embodiment the digital picture 41' (e.g., police mug shot, etc.) includes a digital picture obtained from a database 20', 22', 24', 26' associated with the server network device 20, 22, 24, 26, one or more cloud storage objects 82 associated with the server network 20, 22, 24, 26 and/or the second network device 12, 14, 16, 31 39, 98-104, a non-transitory computer readable medium on the server network device 20, 22, 24, 26 and/or the second network device 12, 14, 16, 31 39, 98-104, the communications network 18, 18' (e.g., the Internet, cloud network, other private and/or public network, etc.). However, the present invention is not limited to such embodiments and other embodiments may be used to practice the invention.

In embodiment, the communications network is a non-cloud communications network 18 and/or a cloud communications network 18. However, the present invention is not limited to such embodiments and other embodiments may be used to practice the invention.

At Step 130, applying a pixelation method on the security application 30a on the server network device 20, 22, 24, 26 to the obtained digital picture 41, the pixilation method decomposing the digital picture into a plural constituent pixels, creating a pixelated digital picture 41a.

In one embodiment, the pixelation method includes, but is not limited to, a pixel interpolation method that smoothly blends and/or interpolates the color of one pixel into the color of the next adjacent pixel at high levels of zoom. In another embodiment, the pixilation method includes a texture filtering and/or texture smoothing method. Such pixelation methods are used to determine a texture color for a texture mapped pixel, using the colors of nearby "texels" (i.e., pixels of a texture). There are two main categories of texture filtering, magnification filtering and minification filtering. However, the present invention is not limited to such embodiments and other pixelation methods may be used to practice the invention.

At Step 132, applying an image contrasting method on the security application 30a on the server network device 20, 22, 22, 26 to the pixelated digital picture 41a, the contrasting method adjusting a contrast of the pixelated digital picture 41a ensuring the pixelated digital picture 41a remains recognizable in a small digital format (e.g., a thumbnail, etc.) and/or densely packed digital format (e.g., a lossless compression of X-bit binary coded decimal information into Y-bit binary coded information using method which can be applied or reversed).

In one embodiment, the image contrasting method includes but is not limited to, a contrast stretch method and/or a histogram equalization method. However, the present invention is not limited to such embodiments and other image contrasting methods may be used to practice the invention.

The contrast stretch method improves the brightness differences uniformly across the dynamic range of the pixelated digital picture 41a, whereas tonal enhancements improve the brightness. However, the present invention is not limited to such embodiments and other image contrasting methods may be used to practice the invention.

The histogram equalization method is an image processing technique that adjusts digital image intensities to improve contrast. Histogram equalization is one of the simplest and commonly used method in low level digital image enhancement using a histogram. A histogram is an approximate representation of the distribution of numerical data. The logic behind histogram equalization is that the image with the best visual appearance, is the one whose histogram looks like a normal distribution. A normal distribution describes a symmetrical plot of data around its mean value, where the width of the curve is defined by a standard deviation. However, the present invention is not limited to such embodiments and other image contrasting methods may be used to practice the invention.

At Step 134, applying a sizing and cropping method on the security application 30a on the server network device 20, 22, 24, 26 to the pixelated digital picture 41a, the sizing and cropping method includes resizing and cropping to fit within a predetermined dimensions of a Quick Response (QR) code 43 of a desired size and maintaining an aspect ratio (e.g., a proportional relationship between an image's width and height etc.) preventing any distortion of an image in the pixelated digital picture 41a.

In one embodiment, the sizing and cropping method includes the process of removing certain regions of the pixelated digital picture 41a and reducing image size accordingly to the predetermined dimensions of the Quick Response (QR) code 43. The pre-determined dimensions of a QR code 43 include a minimum size of 2×2 centimeters (about 0.8×0.8 inches) up to about 3×3 cm (about 1.2 in ×1.2 in) and/or other sizes. However, the present invention is not limited to such embodiments and other sizing and cropping methods can be used to practice the invention.

In FIG. 8B at Step 136, generating the QR code 43 on the security application 30*a* on the server network device 20, 22, 24, 26 of the desired size (e.g., 2×2 cm, 3×3 cm, etc.) based on information in the digital certificate 35, the QR code 43 including error correction information and QR code 43 decoding information.

In one embodiment, the QR code 43 a static and/or dynamic QR code 43 defined by ISO/IEC 18004:2015. This standard defines the requirements for the symbology known as a QR Code. It specifies the QR Code symbology characteristics, data character encoding methods, symbol formats, dimensional characteristics, error correction rules, reference decoding algorithm, production quality requirements, and user-selectable application parameters. The ISO/IEC 18004:2015 standard for QR codes is incorporated herein by reference. However, the present invention is not limited to such embodiments and embodiments can be used to practice the invention.

Static QR codes 43 include, but are not limited to: (1) a one-time purpose code; (2) limited data storage in the code; and (3) provides electronic links to email addresses, Uniform Resource Locators (URLs), electronic text, WiFi passwords, social media links, etc. However, the present invention is not limited to such embodiments and embodiments can be used to practice the invention.

Dynamic QR codes 43 are QR codes that are modifiable in content and can store more data than static QR codes. Dynamic QR codes enable access to real-time activation monitoring and/or determining locations of Dynamic QR code 43 activations made. However, the present invention is not limited to such embodiments and embodiments can be used to practice the invention.

Dynamic QR codes 43 include, but are not limited to the following features: (1) multifunctional QR codes for multiple URL directories; (2) editable and provides the ability to create and/or remove URLs even if your QR code has been printed and or deployed; (2) uses short dynamic URLs in storing data online; (3) QR code activations are trackable so users can see their QR analytics results; (4) allow analytics integration; (5) provide a password protection feature; (6) provide an email notification feature; (7) provide a time expiration feature; (8) allow integration into other non-cloud and cloud applications and cloud services; and (9) provide an API integration feature. However, the present invention is not limited to such embodiments and embodiments can be used to practice the invention.

There are typically four levels of QR code error correction used. The highest level, stores enough backup data to maintain QR code 43 functionality with up to 30% QR code damage. By using a lower level of error correction, less data modules are taken up for storage. The QR code 43 can safely decrease in size. However, the present invention is not limited to such embodiments and embodiments can be used to practice the invention.

The decoding information in QR code 43 includes decoding information for scanning the QR code 43. A QR code 43 typically needs about 10:1 distance-to-size ratio for accurate scanning. The size of the QR code 43 depends on the number of characters encoded in the QR code 43.

There are currently about 40 versions of the QR code framework. Version 2 is 25 data modules wide×25 data modules high. Data modules are the little black and white squares that make up QR codes. Version 37 is 165×165. Each version has a higher information capacity than the previous version. The amount of data in a QR code 43 affects its distance-to-size ratio scanning distance. However, the present invention is not limited to such embodiments and embodiments can be used to practice the invention.

TABLE 5

| Version | Modules | Alphanumeric Characters | 6" Scan Distance | 12" Scan Distance | 18" Scan Distance |
|---------|---------|------------------------|------------------|-------------------|-------------------|
| 2 | 25 × 25 | 47 | 0.6" | 1.2" | 1.8" |
| 7 | 45 × 45 | 224 | 1.0" | 2.0" | 3.0" |
| 17 | 85 × 85 | 938 | 1.8" | 3.6" | 5.4" |
| 27 | 125 × 125 | 2132 | 2.5" | 5.0" | 7.4" |
| 37 | 165 × 165 | 3729 | 3.3" | 6.6" | 13.4" |

At Step 138, embedding with a steganography method on the security application 30*a* on the server network device 20, 22, 24, 26, the pixelated digital picture 41*a* within the QR code 43, the steganography method including concealing information security information from the digital certificate 35 and the error correction information in the QR code 43.

At Step 140, creating a secure digital document 35' including the digital certificate 35 and the QR code 43 including the pixelated digital picture 41*a* on the security application 30*a* on the server network device 20, 22, 24, 26, the secure digital document 35' providing a personalized tamperproof secure digital document, the secure digital document 35' further providing automatic verification of the secure digital document 35' upon scanning of the QR code 43 including the pixelated digital picture 41, the scanning of the QR code from the secure digital document returning electronic information for automatically verifying an image in the digital picture 41 and electronic information stored in the digital certificate 35.

In one embodiment, the secure digital document 35' includes, but is not limited to a police record, court record, government record, business record, academic record, tax record, sales record, and/or personal record and/or a combination thereof. In one embodiment, the police record includes, but is not limited to a background check, criminal records check, outstanding warrant check, and/or outstanding traffic ticket check and/or combination thereof. However, the present invention is not limited to such embodiments and embodiments can be used to practice the invention.

Figure 9:
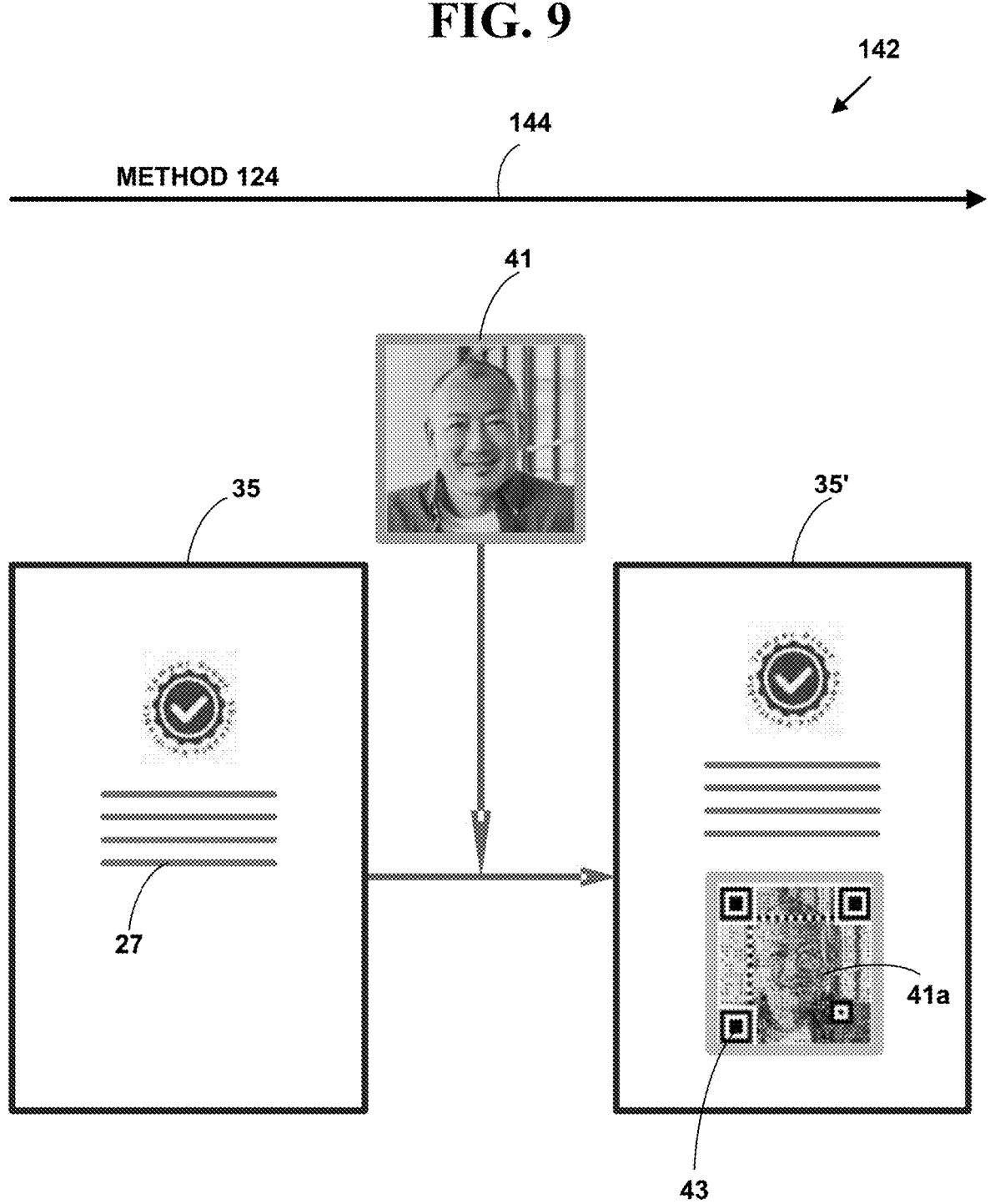
FIG. 9 is a block diagram illustrating a visual data flow for the method of FIG. 8.

FIG. 9 is a block diagram 142 illustrating a visual data flow 144 for the Method 124 of FIG. 8.

FIG. 9 illustrates additional details of digital certificate 35, the pre-determined template 27, digital image 41, pixelated digital picture 41 and secure digital document 35' created with Method 124 of FIG. 8.

FIG. 10 is flow diagram illustrating a Method 146 digital document security processing.

In FIG. 10, at Step 148, creating a cryptographic digital signature for the secure digital document including electronic information included in the digital certificate, the pixelated digital image and the QR code, on the security application on the server network device. At Step 150, storing the cryptographic digital signature on the security application on the server network device, the stored cryptographic digital signature ensuring the integrity of the secure digital document and confirming the digital certificate, the pixelated digital image and the QR code has not been tampered with since its generation.

Method 146 is illustrated with an exemplary embodiment. However the present invention is not limited to such an embodiment and other embodiments can also be used to practice the invention.

In such an exemplary embodiment, in FIG. 10 at Step 148, creating a cryptographic digital signature 29 for the secure digital document 35'including electronic information included in the digital certificate 35, the pixelated digital image 41 and the QR code 43, on the security application 30*a* on the server network device 20, 22, 24, 26.

In one embodiment, the cryptographic digital signature 29 is created with public key cryptography methods including but not limited to, Rivest-Shamir-Adleman (RSA), Advanced Encryption Standard (AES), Elliptic Curve Digital Signature Algorithm (ECDSA), Digital Signature Algorithm (DSA) and/or other public key cryptography methods. However the present invention is not limited to such an embodiment and other embodiments can also be used to practice the invention.

At Step 150, storing the cryptographic digital signature 29 on the security application 30*a* on the server network device 20, 22, 24, 26. The stored cryptographic digital signature 29 ensuring the integrity of the secure digital document 35' and confirming the digital certificate 35, the pixelated digital image 41 and the QR code 43 has not been tampered with since its generation.

In one embodiment, the cryptographic digital signature 29 is stored in a database 20', 22', 24' 26', blockchain 108 and/or one or more cloud storage objects 82 by the security application 30*a* on the server network device 20, 22, 24, 26. However, the present invention is not limited to such an embodiment and other embodiments can be used to practice the invention.

In another embodiment, the cryptographic digital signature 29 is added to and/or embedded into the secure digital document 35'. However, the present invention is not limited to such an embodiment and other embodiments can be used to practice the invention.

FIG. 11 is flow diagram illustrating a Method 152 digital document security processing.

In FIG. 11, at Step 154, creating a blockchain cryptographic digital signature for the secure digital document including electronic information included in the digital certificate, the pixelated digital image and the QR code, on the security application on the server network device. At Step 156, storing the blockchain cryptographic digital signature on the security application on the server network device, the stored blockchain cryptographic digital signature ensuring the integrity of the secure digital document and confirming the digital certificate, the pixelated digital image and the QR code has not been tampered with since its generation.

Method 152 is illustrated with an exemplary embodiment. However the present invention is not limited to such an embodiment and other embodiments can also be used to practice the invention.

In such an exemplary embodiment, in FIG. 11 at Step 154, creating a blockchain 108 cryptographic digital signature 29 for the secure digital document 35' including electronic information included in the digital certificate 35, the pixelated digital image 41 and the QR code 43, on the security application 30*a* on the server network device 20, 22, 24, 26.

In one embodiment the blockchain 108 cryptographic digital signature 29' is created on a block chain application 30*b* on the security application 30*a* on the server network device 20, 22, 24, 26 with public key cryptography methods, including but not limited to, including, but not limited to, Secure Hash Algorithm-256 (SHA-256) or other security and/or encryption methods (e.g., RSA, AES, ECDSA, DSA, MD5, DH, ECB, SHA-1, SHA-512, HMAC, etc.) In another embodiment, the blockchain 108 cryptographic digital signature 29' is created directly on the security application 30*a* with any of the security and/or encryption methods (e.g., SHA-256, RSA, AES, ECDSA, DSA, MD5, DH ECB, SHA-1, SHA-512, HMAC, etc.) described herein. However the present invention is not limited to such an embodiment and other embodiments can also be used to practice the invention.

At Step 156, stored the blockchain 108 cryptographic digital signature 29' on the security application 30*a* on the server network device 20, 22, 24, 26, the stored blockchain 108 cryptographic digital signature 29' ensuring the integrity of the secure digital document 35' and confirming the digital certificate 35, the pixelated digital image 41*a* and the QR code 43 has not been tampered with since its generation.

In one embodiment, the blockchain 108 cryptographic digital signature 29' is stored in a database 20', 22', 24' 26', blockchain 108 and/or one or more cloud storage objects 82 by the security application 30*a* on the server network device 20, 22, 24, 26. However, the present invention is not limited to such an embodiment and other embodiments can be used to practice the invention.

In another embodiment, the cryptographic digital signature 29 is added to and/or embedded into the secure digital document 35'. However, the present invention is not limited to such an embodiment and other embodiments can be used to practice the invention.

FIG. 12 is a flow diagram illustrating a Method 158 for digital document security processing.

In FIG. 12, at Step 160, storing the secure digital document in a blockchain, a database or one or more cloud storage objects on the security application on the server network device. At Step 162, creating on the security application an index of secure digital documents stored on the server network device.

Method 158 is illustrated with an exemplary embodiment. However the present invention is not limited to such an embodiment and other embodiments can also be used to practice the invention.

In such an exemplary embodiment, in FIG. 12 at Step 160, storing the secure digital document 35' in a blockchain 108, a database 20', 22', 24' 26' or one or more cloud storage objects 80 on the security application 30*a* on the server network device 20, 22, 24, 26.

At Step 162, creating on the security application 30*a* an index 33 of secure digital documents stored on the server network device 20, 22, 24, 26.

Figure 13:
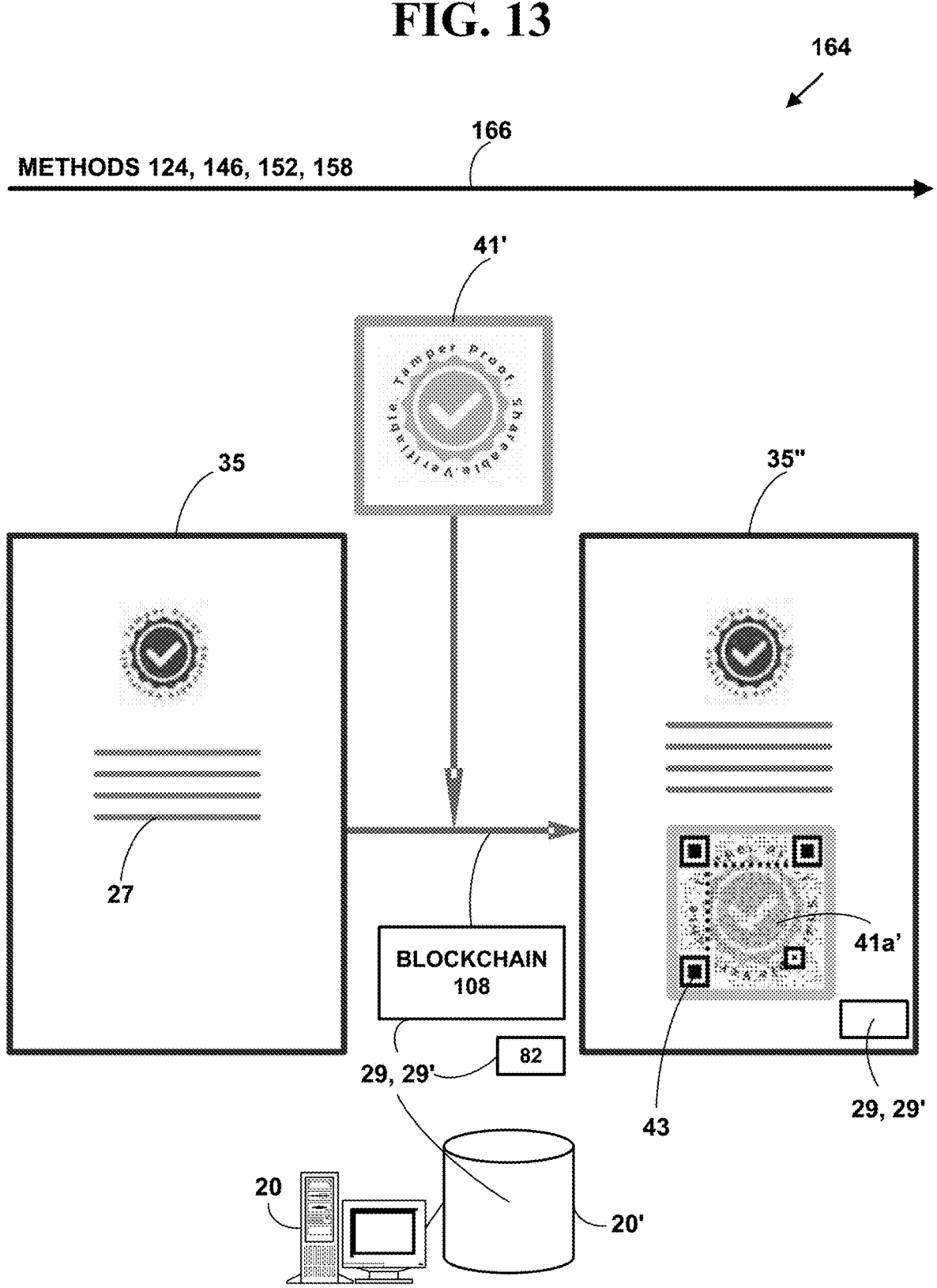
FIG. 13 is a block diagram illustrating a visual data flow for the methods of FIGS. 8, 10, 11 and 12.

FIG. 13 is a block diagram 164 illustrating a visual data flow 166 for the methods of FIGS. 8, 10, 11 and 12.

FIG. 13 illustrates additional details of digital certificate 35, the pre-determined template 27, digital image 41' of a company logo, pixelated digital picture of the company logo 41*a*' and secure digital document 35", cryptographic digital signature 29, blockchain cryptographic digital signature 29, block chain 108 created with Methods 124, 146, 152, 158 of FIGS. 8, 10, 11 and 12.

FIG. 14 is a flow diagram illustrating a Method 168 for digital document security processing.

In FIG. 14 at Step 170, requesting from a third network device with one or more processors a secure digital document for a desired purpose from the security application on the server network device via the communications network. At Step 172, receiving the secure digital document on the third network device, via the communications network from the security application on the server network device including the QR code, the QR code ensuring authenticity, integrity and non-repudiation of the secure digital document. At Step 174, scanning of the QR code from the secure digital document on the third network device returning electronic information for automatically verifying an image in the digital picture and electronic information stored in the digital certificate.

Method 168 is illustrated with an exemplary embodiment. However the present invention is not limited to such an embodiment and other embodiments can also be used to practice the invention.

In such an exemplary embodiment, in FIG. 14 at Step 170, requesting from a third network device 12, 14, 16, 22, 24, 26, 31 39, 98-104 with one or more processors a secure digital document 35' for a desired purpose from the security application 30a on the server network device 20 via the communications network 18, 18'.

At Step 172, receiving the secure digital document 35 on the third network device 16, 22, 24, 26, 31, 39, 98-104 via the communications network 18, 18' from the security application 30a on the server network device 20 including the QR code 43, the QR code 43 ensuring authenticity, integrity, non-repudiation and non-tampering of the secure digital document 35.

At Step 174, scanning of the QR code 43 from the secure digital document 35' on the third network device 12, 14, 16, 22, 24, 26, 31 39, 98-104 returning electronic information for automatically verifying an image in the digital picture 41 and electronic information stored in the digital certificate 35.

In one embodiment, scanning of the QR code 43 from the secure digital document on the third network device 12, 14, 16, 22, 24, 26, 31 39, 98-104, also allows for automatic visual verification of the image in the digital picture 41 using one or more facial recognition methods. However, the present invention is not limited to such an embodiment and other embodiments can be used to practice the invention.

A facial recognition system is a technology capable of matching a human face from a digital image and or a video frame against a database of faces stored in a digital format. Such a system is typically employed to authenticate people through identification verification services, and works by pinpointing and measuring facial features from a given digital image of a human face.

In another embodiment, scanning of the QR code 43 from the secure digital document on the third network device 12, 14, 16, 22, 24, 26, 31 39, 98-104, also allows for manual visual verification of the image in the digital picture 41. However, the present invention is not limited to such an embodiment and other embodiments can be used to practice the invention.

A method and system for digital document security with embedded Quick Response (QR) codes is presented herein. A Quick Response (QR) code with a digital picture is embedded in a digital document creating a secure digital document. The secure digital document with the embedded QR code helps to prevent tampering of the secure digital document. Upon scanning the QR code in the secure digital document, the contents of the digital document and the contents of digital picture are verified confirming the authenticity, integrity, non-repudiation and non-tampering of the contents of the digital picture and the secure digital document.

It should be understood that the architecture, programs, processes, methods and systems described herein are not related or limited to any particular type of computer or network system (hardware or software), unless indicated otherwise. Various types of specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. § 112, paragraph 6, and any claim without the word "means" is not so intended.

Therefore, all embodiments that come within the scope and spirit of the following claims and equivalents thereto are claimed as the invention.

We claim:

1. A method for secure digital document processing, comprising:
    preparing on a security application on a server network device with one or more processors, a digital certificate in a predetermined template,
    the predetermined template including a plurality of general information fields and personalized information fields;
    obtaining on the security application on the server network device a digital picture to be used on the digital certificate from a second network device with one or more processors via a communications network;
    applying a pixelation method on the security application on the server network device to the obtained digital picture, the pixilation method decomposing the digital picture into a plurality of constituent pixels, creating a pixelated digital picture;
    applying an image contrasting method on the security application on the server network device to the pixelated digital picture, the contrasting method adjusting a contrast of the pixelated digital picture ensuring the pixelated digital picture remains recognizable in a small digital format or densely packed digital format;
    applying a sizing and cropping method on the security application on the server network device to the pixelated digital picture, the sizing and cropping method includes resizing and cropping to fit within a predetermined dimensions of a Quick Response (QR) code of a desired size and maintaining an aspect ratio preventing any distortion of an image in the pixelated digital picture;
    generating the QR code on the security application on the server network device of the desired size based on information in the digital certificate, the QR code including error correction information and QR code decoding information;
    embedding with a steganography method on the security application on the server network device, the pixelated digital picture within the QR code, the steganography method including concealing information security information from the digital certificate and the error correction information in the QR code; and
    creating a secure digital document including the digital certificate and the QR code including the pixelated digital picture on the security application on the server network device, the QR code providing authenticity and integrity of the secure digital document, the secure digital document providing a personalized tamperproof secure digital document, the secure digital document further providing automatic verification of the secure digital document upon scanning of the QR code including the pixelated digital picture, the scanning of the QR code from the secure digital document returning electronic information for automatically verifying an image in the digital picture and electronic information stored in the digital certificate in the secure digital document.

2. The method of claim 1 further comprising:

creating a cryptographic digital signature for the secure digital document including electronic information included in the digital certificate, the pixelated digital image and the QR code, on the security application on the server network device; and storing the cryptographic digital signature on the security application on the server network device, the storing cryptographic digital signature ensuring the integrity of the secure digital document and confirming the digital certificate, the pixelated digital image and the QR code has not been tampered with since its generation.

3. The method of claim 2, wherein the cryptographic digital signature is created using public key cryptography methods.

4. The method of claim 3 wherein the public key cryptography methods include Rivest-Shamir-Adleman (RSA), Advanced Encryption Standard (AES), Elliptic Curve Digital Signature Algorithm (ECDSA), Digital Signature Algorithm (DSA) or X.509 public key cryptography methods.

5. The method of claim 1 further comprising:

creating a blockchain cryptographic digital signature for the secure digital document including electronic information included in the digital certificate, the pixelated digital image and the QR code, on the security application on the server network device; and storing the blockchain cryptographic digital signature on the security application on the server network device, the stored blockchain cryptographic digital signature ensuring the integrity of the secure digital document and confirming the digital certificate, the pixelated digital image and the QR code has not been tampered with since its generation.

6. The method of claim 5 the blockchain cryptographic digital signature is created with using public key cryptography methods.

7. The method of claim 6 wherein the blockchain public key cryptography methods include Secure Hash Algorithm-256 (SHA-256).

8. The method of claim 1 further comprising:

storing the secure digital document in a blockchain, a database or one or more cloud storage objects on the security application on the server network device; and creating on the security application an index of secure digital documents stored on the server network device.

9. The method of claim 1 wherein the digital picture includes a digital picture of a human, animal, building, land, company logo, government seal, school, college or university seal, or a corporate seal.

10. The method of claim 9 wherein the digital picture of the human includes a police mug shot of a person arrested for a criminal offense.

11. The method of claim 1 wherein the secure digital document includes a police record, court record, government record, business record, academic record, tax record, sales record, or personal record.

12. The method of claim 11 wherein the police record includes a background check, criminal records check, outstanding warrant check, or outstanding traffic ticket check.

13. The method of claim 1 wherein the second network device includes: one or more other server network devices, desktop computers, laptop computers, tablet computers, mobile phones, non-mobile phones, smart phones, Internet phones, Internet appliances, personal digital/data assistants (PDA), portable, handheld video game devices, desktop video game devices, cable television (CATV) set-top boxes, satellite television (SATV) set-top boxes, Internet television set-top boxes, digital televisions including high definition television (HDTV), three-dimensional (3DTV) televisions, wearable network devices, smart speakers and Internet of Things (IoT), network devices.

14. The method of claim 1 wherein the server network device and the second network device include one or more wireless communications interfaces comprising: cellular telephone, 802.11a, 802.11b, 802.11g, 802.11n, 802.15.4 (ZigBee), Wireless Fidelity (Wi-Fi), Wi-Fi Aware, RF Home, Worldwide Interoperability for Microwave Access (WiMAX), ETSI High Performance Radio Metropolitan Area Network (HIPERMAN), Near Field Communications (NFC), Machine-to-Machine (M2M), Bluetooth or infra data association (IrDA), wireless communication interfaces.

15. The method of claim 1 wherein the communications network includes a cloud communications network and the security application on the server network device includes a cloud Software as a Service (SaaS) for providing secure digital document processing services.

16. The method of claim 15 wherein The SaaS stores the secure digital document in a database, blockchain or in one or more cloud storage objects.

17. The method of claim 1 wherein further including an Artificial Intelligence (AI) application on security application on the server network device for automatic secure digital document processing from the security application on the server network device with one or more AI applications.

18. The method of claim 1 further comprising:

receiving the secure digital document on the second network device via the communications network from the security application on the server network device;

scanning the QR code on the secure digital document on the second network device returning electronic information and automatically verifying an image in the digital picture and electronic information stored in the digital certificate in the secure digital document.

19. The method of claim 1 further comprising:

requesting from a third network device with one or more processors a secure digital document for a desired purpose from the security application on the server network device via the communications network;

receiving the secure digital document on the third network device via the communications network from the security application on the server network device including the QR code, the QR code ensuring authenticity, integrity, non-repudiation and non-tampering of the secure digital document; and scanning the QR code from the secure digital document on the third network device returning electronic information for automatically verifying an image in the digital picture and electronic information stored in the digital certificate in the secure digital document.

20. A non-transitory computer readable medium having stored therein a plurality of instructions for causing one or more processors to execute steps, comprising:

preparing on a security application on a server network device with one or more processors, a digital certificate in a predetermined template, the predetermined template including general information fields and personalized information fields;

obtaining on the security application on the server network device a digital picture to be used on the digital certificate from a second network device with one or more processors via a communications network;

applying a pixelation method on the security application on the server network device to the obtained digital picture, the pixilation method decomposing the digital picture into a plurality of constituent pixels, creating a pixelated digital picture;

applying a image contrasting method on the security application on the server network device to the pixelated digital picture, the contrasting method adjusting a contrast of the pixelated digital picture ensuring the pixelated digital picture remains recognizable in a small digital format or densely packed digital format;

applying a sizing and cropping method on the security application on the server network device to the pixelated digital picture, the sizing and cropping method includes resizing and cropping to fit within a predetermined dimensions of a Quick Response (QR) code of a desired size and maintaining an aspect ratio preventing any distortion of an image in the pixelated digital picture;

generating the QR code on the security application on the server network device of the desired size based on information in the digital certificate, the QR code including error correction information and QR code decoding information;

embedding with a steganography method on the security application on the server network device, the pixelated digital picture within the QR code, the steganography method including concealing information security information from the digital certificate and the error correction information in the QR code; and creating a secure digital document including the digital certificate and the QR code including the pixelated digital picture on the security application on the server network device, the QR code providing authenticity and integrity of the secure digital document, the secure digital document providing a personalized tamperproof secure digital document, the secure digital document further providing automatic verification of the secure digital document upon scanning of the QR code including the pixelated digital picture, the scanning of the QR code returning electronic information for automatically verifying an image in the digital picture and electronic information stored in the digital certificate in the secure digital document.

21. A system for automatically providing a method for a digital document for security processing, comprising in combination:

one or more server network devices each with one or more processors and a non-transitory computer readable medium;

one or more other network devices each with one or more processors and a non-transitory computer readable medium;

a communications network;

for preparing on a security application on a server network device with one or more processors, a digital certificate in a predetermined template, the predetermined template including general information fields and personalized information fields;

for obtaining on the security application on the server network device a digital picture to be used on the digital certificate from a second network device with one or more processors via a communications network;

for applying a pixelation method on the security application on the server network device to the obtained digital picture, the pixilation method decomposing the digital picture into a plurality of constituent pixels, creating a pixelated digital picture;

for applying an image contrasting method on the security application on the server network device to the pixelated digital picture, the contrasting method adjusting a contrast of the pixelated digital picture ensuring the pixelated digital picture remains recognizable in a small digital format or densely packed digital format;

for applying a sizing and cropping method on the security application on the server network device to the pixelated digital picture, the sizing and cropping method includes resizing and cropping to fit within a predetermined dimensions of a Quick Response (QR) code of a desired size and maintaining an aspect ratio preventing any distortion of an image in the pixelated digital picture;

for generating the QR code on the security application on the server network device of the desired size based on information in the digital certificate, the QR code including error correction information and QR code decoding information;

for embedding with a steganography method on the security application on the server network device, the pixelated digital picture within the QR code, the steganography method including concealing information security information from the digital certificate and the error correction information in the QR code;

for creating a secure digital document including the digital certificate and the QR code including the pixelated digital picture on the security application on the server network device, the QR code providing authenticity and integrity of the secure digital document, the secure digital document providing a personalized tamperproof secure digital document, the secure digital document further providing automatic verification of the secure digital document upon scanning of the QR code including the pixelated digital picture, the scanning of the QR code returning electronic information for automatically verifying an image in the digital picture and electronic information stored in the digital certificate;

for creating a cryptographic digital signature or a blockchain digital signature for the secure digital document including electronic information including in the digital certificate, the pixelated digital image and the QR code, on the security application on the server network device;

for storing the cryptographic digital signature or the blockchain digital signature for the secure digital document the security application on the server network device, cryptographic digital signature or the blockchain digital signature ensuring the secure digital documents integrity and ensuring the digital certificate, the pixelated digital image and the QR code in the secure digital document has not been tampered with since its generation;

for storing the secure digital document in a blockchain on the security application on the server network device; and for scanning the QR code from the secure digital document on a third network device with one or more processors returning electronic information for automatically verifying an image in the digital picture and electronic information stored in the digital certificate in the secure digital document.

\* \* \* \* \*